United States Patent
Wei et al.

(10) Patent No.: US 12,127,063 B2
(45) Date of Patent: Oct. 22, 2024

(54) INFRASTRUCTURE EQUIPMENT, CENTRAL UNIT NODES AND METHODS

(71) Applicant: Sony Group Corporation, Tokyo (JP)

(72) Inventors: Yuxin Wei, Basingstoke (GB); Vivek Sharma, Basingstoke (GB); Hideji Wakabayashi, Basingstoke (GB); Yassin Aden Awad, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 193 days.

(21) Appl. No.: 17/789,809

(22) PCT Filed: Dec. 22, 2020

(86) PCT No.: PCT/EP2020/087644
§ 371 (c)(1),
(2) Date: Jun. 29, 2022

(87) PCT Pub. No.: WO2021/140032
PCT Pub. Date: Jul. 15, 2021

(65) Prior Publication Data
US 2023/0039422 A1    Feb. 9, 2023

(30) Foreign Application Priority Data
Jan. 10, 2020   (EP) .................................... 20151274

(51) Int. Cl.
*H04W 36/12*      (2009.01)
*H04B 7/155*      (2006.01)
(52) U.S. Cl.
CPC ...... *H04W 36/125* (2018.08); *H04B 7/15528* (2013.01)
(58) Field of Classification Search
CPC ............. H04W 36/125; H04W 84/005; H04W 84/047; H04W 36/12; H04B 7/15528
See application file for complete search history.

(56) References Cited

U.S. PATENT DOCUMENTS

2021/0227435 A1*  7/2021  Hsieh ..................... H04W 36/08
2022/0014976 A1*  1/2022  Luo ........................ H04W 36/12
(Continued)

FOREIGN PATENT DOCUMENTS

WO    2019/246446 A1    12/2019

OTHER PUBLICATIONS

International Search Report and Written Opinion mailed on Mar. 29, 2021, received for PCT Application PCT/EP2020/087644, filed on Dec. 22, 2020, 11 pages.

(Continued)

*Primary Examiner* — Hashim S Bhatti
(74) *Attorney, Agent, or Firm* — XSENSUS LLP

(57) ABSTRACT

A first infrastructure equipment configured to communicate with a core network part of a wireless communications network via a first central unit node communicatively coupled to the core network part, wherein the first central unit node controls a first zone of the wireless communications network. The first infrastructure equipment configured to perform measurements on signals received from one or more of the first central unit node and the one or more of the plurality of other infrastructure equipment, to transmit, to the first central unit node, a measurement report comprising an indication of the measurements performed on the received signals, to receive, from the first central unit node, a command signal comprising an indication that the first infrastructure equipment should communicate with the core network part via a second central unit node communicatively coupled to the core network part instead of the first central unit node.

20 Claims, 10 Drawing Sheets

(56) References Cited

U.S. PATENT DOCUMENTS

2022/0104110 A1* 3/2022 Khanfouci ............ H04W 36/34
2022/0322464 A1* 10/2022 Luo ....................... H04W 76/11

OTHER PUBLICATIONS

NTT DOCOMO, "Discussion on enhancements to support NR backhaul links", 3GPP TSG-RAN WG1 Meeting #95, R1-1813316, Nov. 12-16, 2018, 10 pages.
ZTE, "Discussion on IAB node access procedure", 3GPP TSG-RAN WG2 Meeting #102, R2-1807401, May 21-25, 2018, 5 pages.
Qualcomm et al., "Proposals on IAB Architecture" 3GPP TSG-RAN WG2 NR Ad hoc 1801, R2-1801606, Jan. 22-26, 2018, 7 pages.
Huawei et al., "Revised work item proposal: Enhancements of NB-IoT", 3GPP TSG RAN Meeting #73, RP-161901, Sep. 19-22, 2016, 8 pages.
Holma et al., "LTE for UMTS OFDMA and SC-FDMA Based Radio Access", John Wiley & Sons, 2009, 232 pages.
3GPP, "Study on Integrated Access and Backhaul; (Release 15)", 3GPP TR 38.874 V0.1.0, Feb. 2018, pp. 1-11.
AT&T et al., "New SID Proposal: Study on Integrated Access and Backhaul for NR", 8881123GPP TSG RAN Meeting #75, RP-170821, Mar. 6-9, 2017, 5 pages.
Qualcomm Inc et al., "Way Forward—IAB Architecture for L2/3 relaying", 3GPP TSG-RAN WG3 Meeting #99, R3-181502, Jan. 26-Mar. 2, 2018, 6 pages.

* cited by examiner

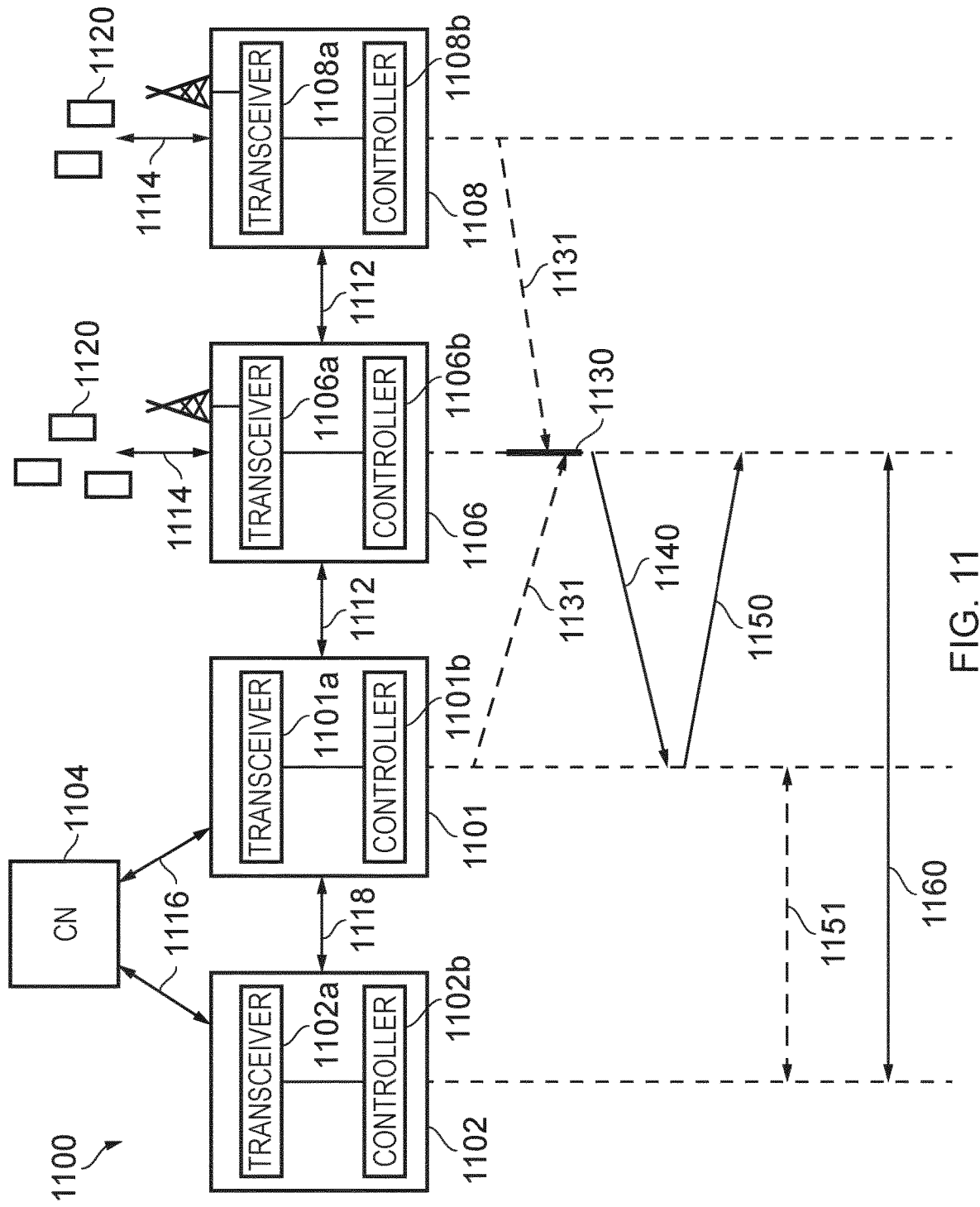

INFRASTRUCTURE EQUIPMENT, CENTRAL UNIT NODES AND METHODS

CROSS-REFERENCE TO RELATED APPLICATIONS

The present application is based on PCT filing PCT/EP2020/087644, filed Dec. 22, 2020, which claims priority to EP 20151274.6, filed Jan. 10, 2020, the entire contents of each are incorporated herein by reference.

BACKGROUND

Field of Disclosure

The present disclosure relates to methods and apparatus for the communication of signals between various infrastructure equipment, central and distributed unit nodes, and the core network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recent generation mobile telecommunication systems, such as those based on the 3GPP defined UMTS and Long Term Evolution (LTE) architectures, are able to support a wider range of services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. In addition to supporting these kinds of more sophisticated services and devices, it is also proposed for newer generation mobile telecommunication systems to support less complex services and devices which make use of the reliable and wide ranging coverage of newer generation mobile telecommunication systems without necessarily needing to rely on the high data rates available in such systems. The demand to deploy such networks is therefore strong and the coverage area of these networks, i.e. geographic locations where access to the networks is possible, may be expected to increase ever more rapidly.

Future wireless communications networks will therefore be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

As radio technologies continue to improve, for example with the development of 5G, the possibility arises for these technologies to be used not only by infrastructure equipment to provide service to wireless communications devices in a cell, but also for interconnecting infrastructure equipment to provide a wireless backhaul. In view of this, there is a need to ensure that links between various infrastructure equipment in the backhaul are both stable and reliable, particularly where an infrastructure equipment connected to the core network through another of the infrastructure equipment moves away from this infrastructure equipment, or otherwise requires a different connection to the core network.

SUMMARY OF THE DISCLOSURE

The present disclosure can help address or mitigate at least some of the issues discussed above as defined in the appended claims.

Embodiments of the present technique can provide a first infrastructure equipment forming part of a wireless communications network comprising a plurality of other infrastructure. The first infrastructure equipment is configured to communicate with one or more of the plurality of other infrastructure equipment and the first infrastructure equipment being configured to communicate with a core network part of the wireless communications network via a first central unit node communicatively coupled to the core network part, wherein the first central unit node controls a first zone of the wireless communications network. The first infrastructure equipment comprises transceiver circuitry and controller circuitry which are configured in combination to perform measurements on signals received from one or more of the first central unit node and the one or more of the plurality of other infrastructure equipment, to transmit, to the first central unit node, a measurement report comprising an indication of the measurements performed on the received signals, to receive, from the first central unit node, a command signal comprising an indication that the first infrastructure equipment should communicate with the core network part via a second central unit node communicatively coupled to the core network part instead of the first central unit node, wherein the second central unit node controls a second zone of the wireless communications network, wherein the command signal indicates that the first central unit node is to perform a handover procedure with the second central unit node, the handover procedure comprising the first central unit node transmitting configuration information of the first infrastructure equipment to the second central unit node, and to communicate with the core network part via the second central unit node.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein:

FIG. 11 shows a part schematic, part message flow diagram of communications in a wireless communications system in accordance with embodiments of the present technique;

DETAILED DESCRIPTION OF THE EMBODIMENTS

Long Term Evolution (LTE) Wireless Communications System

Figure 1:
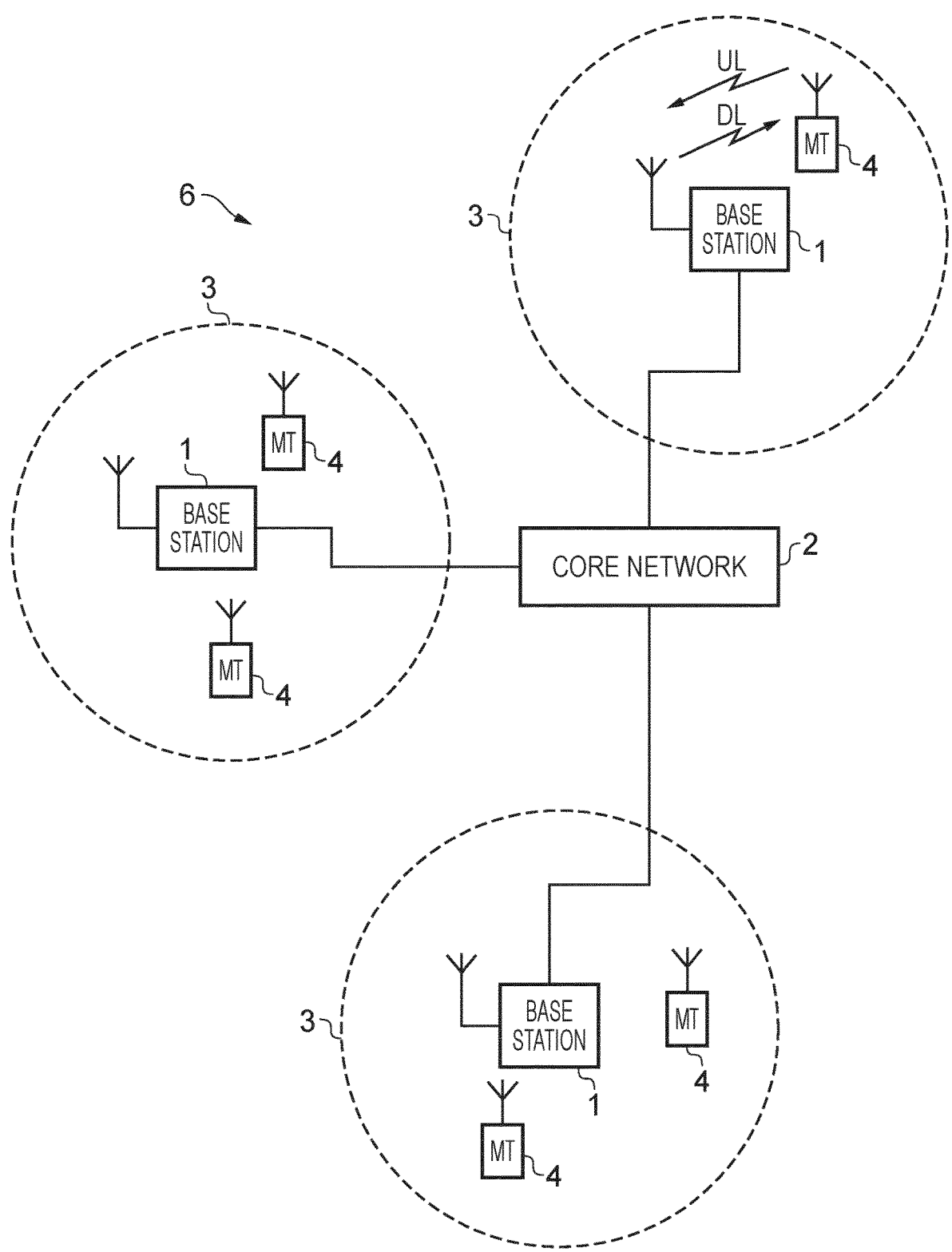
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4.

Although each base station 1 is shown in FIG. 1 as a single entity, the skilled person will appreciate that some of the functions of the base station may be carried out by disparate, inter-connected elements, such as antennas (or antennae), remote radio heads, amplifiers, etc. Collectively, one or more base stations may form a radio access network.

Data is transmitted from base stations 1 to communications devices 4 within their respective coverage areas 3 via a radio downlink Data is transmitted from communications devices 4 to the base stations 1 via a radio uplink. The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth.

Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G) Wireless Communications System

Figure 2:
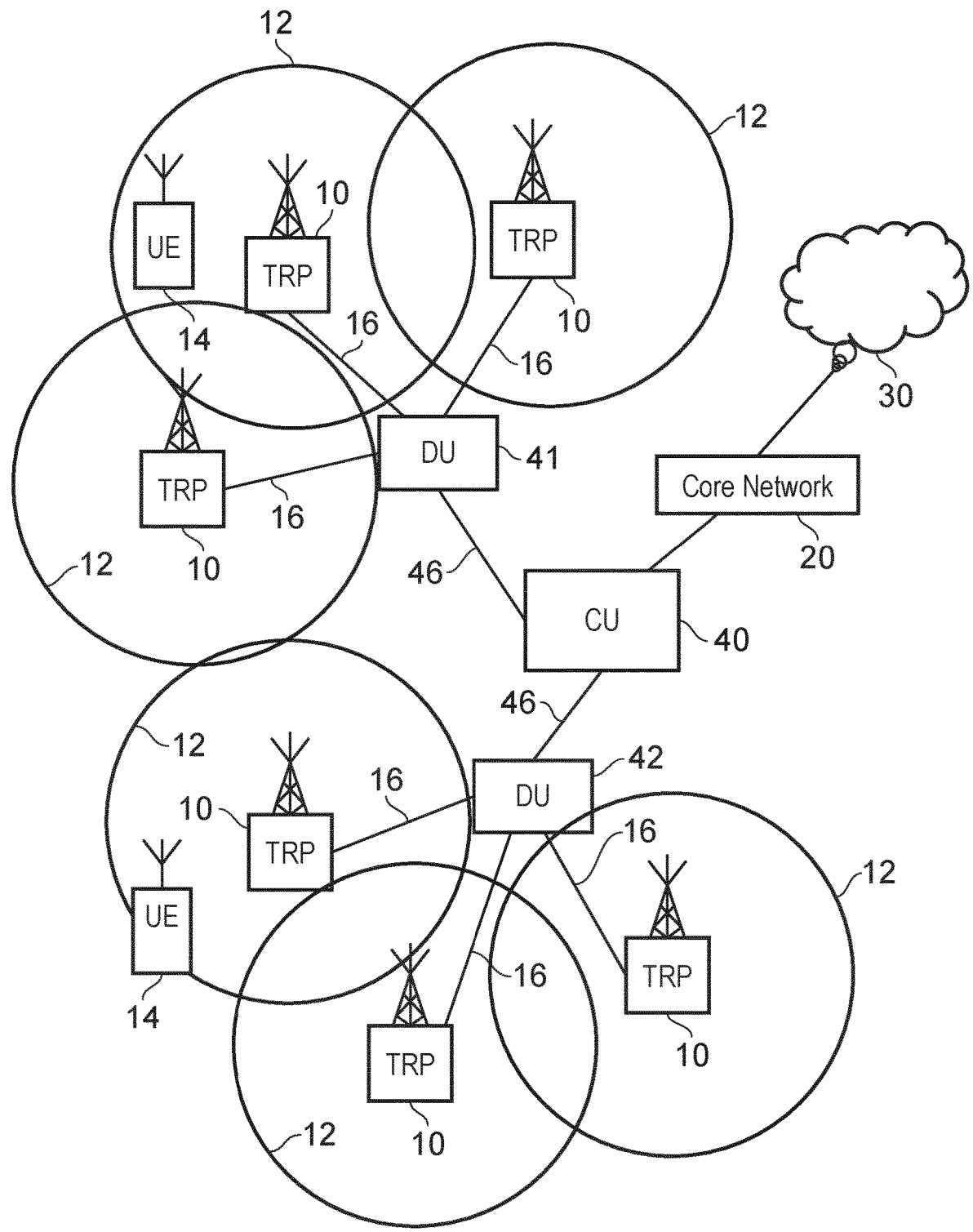
FIG. 2 schematically represents some aspects of a new radio access technology (RAT) wireless communications system which may be configured to operate in accordance with certain embodiments of the present disclosure.

An example configuration of a wireless communications network which uses some of the terminology proposed for NR and 5G is shown in FIG. 2. A 3GPP Study Item (SI) on New Radio Access Technology (NR) has been defined [2]. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the a core network 20 which may contain all other functions required to transmit and receive data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signaling with the first central unit 40 in the first communication cell 212 via one of the distributed units 10 associated with the first communication cell 12.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
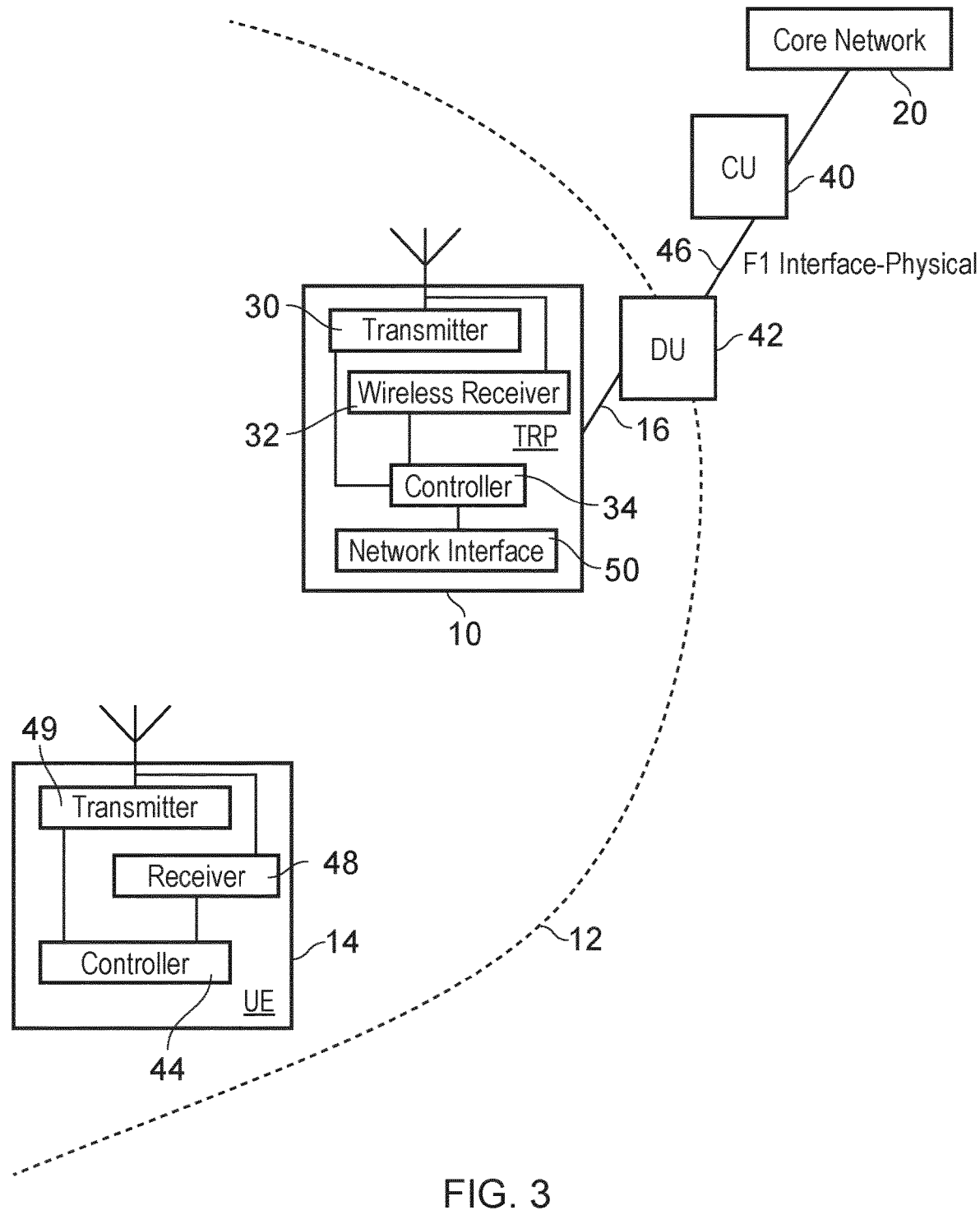
FIG. 3 is a schematic block diagram of some components of the wireless communications system shown in FIG. 2 in more detail in order to illustrate example embodiments of the present technique.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 49 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance for example with the 5G/NR standard. The controllers 34, 44, 48 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium.

As shown in FIG. 3, the TRP 10 also includes a network interface 50 which connects to the DU 42 via a physical interface 16. The network interface 50 therefore provides a communication link for data and signaling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473, and may be formed from a fibre optic or other wired high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP 10 to the DU 42 and the F1 interface 46 from the DU 42 to the CU 40.

Figure 4:
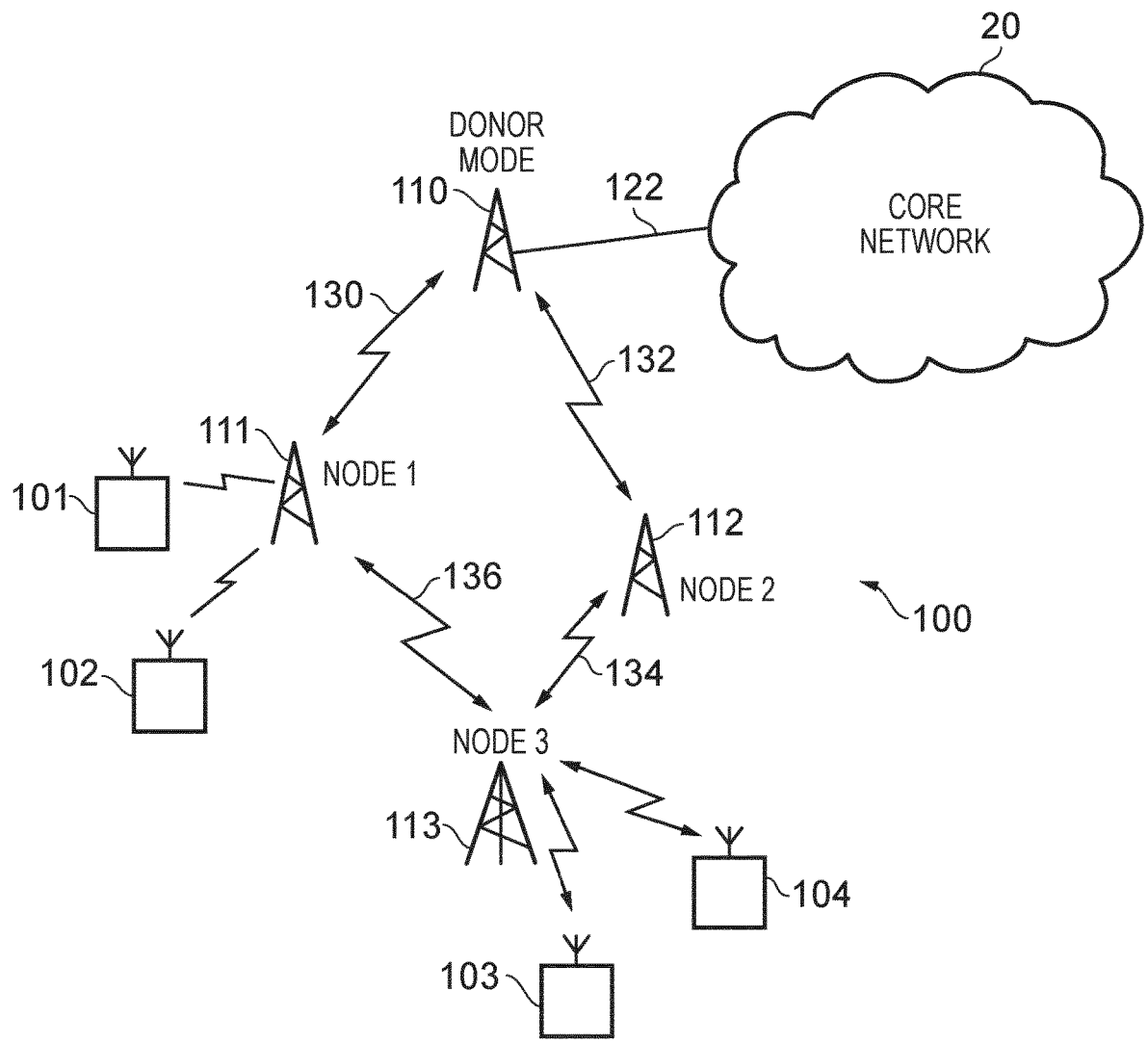
FIG. 4 schematically represents some aspects of an example wireless telecommunication network which may be configured to operate in accordance with certain embodiments of the present disclosure.

Example arrangements of the present technique can be formed from a wireless communications network corresponding to that shown in FIG. 1 or 2, as shown in FIG. 4. FIG. 4 provides an example in which cells of a wireless communications network are formed from infrastructure equipment which are provided with an Integrated Access and Backhaul (IAB) capability. The wireless communications network 100 comprises the core network 20 and a first, a second, a third and a fourth communications device (respectively 101, 102, 103 and 104) which may broadly correspond to the communications devices 4, 14 described above.

The wireless communications network 100 comprises a radio access network, comprising a first infrastructure equipment 110, a second infrastructure equipment 111, a third infrastructure equipment 112, and a fourth infrastructure equipment 113. Each of the infrastructure equipment provides a coverage area (i.e. a cell, not shown in FIG. 4) within which data can be communicated to and from the communications devices 101 to 104. For example, the fourth infrastructure equipment 113 provides a cell in which the third and fourth communications devices 103 and 104 may obtain service. Data is transmitted from the fourth infrastructure equipment 113 to the fourth communications device 104 within its respective coverage area (not shown) via a radio downlink. Data is transmitted from the fourth communications device 104 to the fourth infrastructure equipment 113 via a radio uplink.

The infrastructure equipment 110 to 113 in FIG. 4 may correspond broadly to the TRPs 10 of FIG. 2 and FIG. 3.

The first infrastructure equipment 110 in FIG. 4 is connected to the core network 20 by means of one or a series of physical connections. The first infrastructure equipment 110 may comprise the TRP 10 (having the physical connection 16 to the DU 42) in combination with the DU 42 (having a physical connection to the CU 40 by means of the F1 interface 46) and the CU 40 (being connected by means of a physical connection to the core network 20).

However, there is no direct physical connection between any of the second infrastructure equipment 111, the third infrastructure equipment 112, and the fourth infrastructure equipment 113 and the core network 20. As such, it may be necessary (or, otherwise determined to be appropriate) for data received from a communications device (i.e. uplink data), or data for transmission to a communications device (i.e. downlink data) to be transmitted to or from the core network 20 via other infrastructure equipment (such as the first infrastructure equipment 110) which has a physical connection to the core network 20, even if the communications device is not currently served by the first infrastructure equipment 110 but is, for example, in the case of the wireless communications device 104, served by the fourth infrastructure equipment 113.

The second, third and fourth infrastructure equipment 111 to 113 in FIG. 4 may each comprise a TRP, broadly similar in functionality to the TRPs 10 of FIG. 2.

In some arrangements of the present technique, one or more of the second to fourth infrastructure equipment 111 to 113 in FIG. 4 may further comprise a DU 42, and in some arrangements of the present technique, one or more of the second to fourth infrastructure equipment 110 to 113 may comprise a DU and a CU.

In some arrangements of the present technique, the CU 40 associated with the first infrastructure equipment 110 may perform the function of a CU not only in respect of the first infrastructure equipment 110, but also in respect of one or more of the second, the third and the fourth infrastructure equipment 111 to 113.

In order to provide the transmission of the uplink data or the downlink data between a communications device and the core network, a route is determined by any suitable means, with one end of the route being an infrastructure equipment physically connected to a core network and by which uplink and downlink traffic is routed to or from the core network.

In the following, the term 'node' is used to refer to an entity or infrastructure equipment which forms a part of a route for the transmission of the uplink data or the downlink data.

An infrastructure equipment which is physically connected to the core network and operated in accordance with an example arrangement may provide communications resources to other infrastructure equipment and so is referred to as a 'donor node'. An infrastructure equipment which acts as an intermediate node (i.e. one which forms a part of the route but is not acting as a donor node) is referred to as a 'relay node'. It should be noted that although such intermediate node infrastructure equipment act as relay nodes in the backhaul link, they may also provide service to communications devices. The relay node at the end of the route which is the infrastructure equipment controlling the cell in which the communications device is obtaining service is referred to as an 'end node'.

In the wireless network illustrated in FIG. 4, each of the first to fourth infrastructure equipment 110 to 113 may therefore function as nodes. For example, a route for the transmission of uplink data from the fourth communications device 104 may consist of the fourth infrastructure equipment 113 (acting as the end node), the third infrastructure equipment 112 (acting as a relay node), and the first infrastructure equipment 110 (acting as the donor node). The first infrastructure 110, being connected to the core network 20, transmits the uplink data to the core network 20.

For clarity and conciseness in the following description, the first infrastructure equipment 110 is referred to below as the 'donor node', the second infrastructure equipment 111 is referred to below as 'Node 1', the third infrastructure equipment 112 is referred to below as 'Node 2' and the fourth infrastructure equipment 113 is referred to below as 'Node 3'.

For the purposes of the present disclosure, the term 'upstream node' is used to refer to a node acting as a relay node or a donor node in a route, which is a next hop when used for the transmission of data via that route from a wireless communications device to a core network. Similarly, 'downstream node' is used to refer to a relay node from which uplink data is received for transmission to a core network. For example, if uplink data is transmitted via a route comprising (in order) the Node 3 113, the Node 1 111 and the donor node 110, then the donor node 110 is an upstream node with respect to the Node 1 111, and the Node 3 113 is a downstream node with respect to the Node 1 111.

More than one route may be used for the transmission of the uplink/downlink data from/to a given communications device; this is referred to herein as 'multi-connectivity'. For example, the uplink data transmitted by the wireless communications device 104 may be transmitted either via the Node 3 113 and the Node 2 112 to the donor node 110, or via the Node 3 113 and the Node 1 111 to the donor node 110.

In the following description, example arrangements are described in which each of the nodes is an infrastructure equipment; the present disclosure is not so limited. A node may comprise at least a transmitter, a receiver and a controller. In some arrangements of the present technique, the functionality of a node (other than the donor node) may be carried out by a communications device, which may be the communications device 4 (of FIG. 1) or 14 (of FIG. 2), adapted accordingly. As such, in some arrangements of the present technique, a route may comprise one or more communications devices. In other arrangements, a route may consist of only a plurality of infrastructure equipment.

In some arrangements of the present technique, an infrastructure equipment acting as a node may not provide a wireless access interface for the transmission of data to or by a communications device other than as part of an intermediate transmission along a route.

In some arrangements of the present technique, a route is defined considering a wireless communications device (such as the wireless communications device 104) as the start of a route. In other arrangements a route is considered to start at an infrastructure equipment which provides a wireless access interface for the transmission of the uplink data by a wireless communications device.

Each of the first infrastructure equipment acting as the donor node 110 and the second to fourth infrastructure equipment acting as the Nodes 1 to 3 111, 112, 113 may communicate with one or more other nodes by means of an inter-node wireless communications link, which may also be referred to as a wireless backhaul communications links. For example, FIG. 4 illustrates four inter-node wireless communications links 130, 132, 134, 136.

Each of the inter-node wireless communications links 130, 132, 134, 136 may be provided by means of a respective wireless access interface. Alternatively, two or more of the inter-node wireless communications links 130, 132, 134, 136 may be provided by means of a common wireless access interface and in particular, in some arrangements of the present technique, all of the inter-node wireless communications links 130, 132, 134, 136 are provided by a shared wireless access interface.

A wireless access interface which provides an inter-node wireless communications link may also be used for communications between an infrastructure equipment (which may be a node) and a communications device which is served by the infrastructure equipment. For example, the fourth wireless communications device 104 may communicate with the infrastructure equipment Node 3 113 using the wireless access interface which provides the inter-node wireless communications link 134 connecting the Node 3 113 and the Node 2 112.

The wireless access interface(s) providing the inter-node wireless communications links 130, 132, 134, 136 may operate according to any appropriate specifications and techniques. In some arrangements of the present technique, a wireless access interface used for the transmission of data from one node to another uses a first technique and a wireless access interface used for the transmission of data between an infrastructure equipment acting as a node and a communications device may use a second technique different from the first. In some arrangements of the present technique, the wireless access interface(s) used for the transmission of data from one node to another and the wireless access interface(s) used for the transmission of data between an infrastructure equipment and a communications device use the same technique.

Examples of wireless access interface standards include the third generation partnership project (3GPP)-specified GPRS/EDGE ("2G"), WCDMA (UMTS) and related standards such as HSPA and HSPA+ ("3G"), LTE and related standards including LTE-A ("4G"), and NR ("5G"). Techniques that may be used to provide a wireless access interface include one or more of TDMA, FDMA, OFDMA, SC-FDMA, CDMA. Duplexing (i.e. the transmission over a wireless link in two directions) may be by means of frequency division duplexing (FDD) or time division duplexing (TDD) or a combination of both.

In some arrangements of the present technique, two or more of the inter-node wireless communications links 130, 132, 134, 136 may share communications resources. This may be because two or more of the inter-node wireless communications links 130, 132, 134, 136 are provided by means of a single wireless access interface or because two or more of the inter-node wireless communications links 130, 132, 134, 136 nevertheless operate simultaneously using a common range of frequencies.

The nature of the inter-node wireless communications links 130, 132, 134, 136 may depend on the architecture by which the wireless backhaul functionality is achieved.

Integrated Access and Backhaul (IAB) for NR

One area of NR under development is Integrated Access and Backhaul (IAB). Several requirements and aspects for the integrated access and wireless backhaul for NR to address are discussed in [3], which include:

Efficient and flexible operation for both inband and outband relaying in indoor and outdoor scenarios;
Multi-hop and redundant connectivity;
End-to-end route selection and optimisation;
Support of backhaul links with high spectral efficiency;
Support of legacy NR UEs.

The stated objective of the study detailed in [3] is to identify and evaluate potential solutions for topology management for single-hop/multi-hop and redundant connectivity, route selection and optimisation, dynamic resource allocation between the backhaul and access links, and achieving high spectral efficiency while also supporting reliable transmission.

Figure 5:
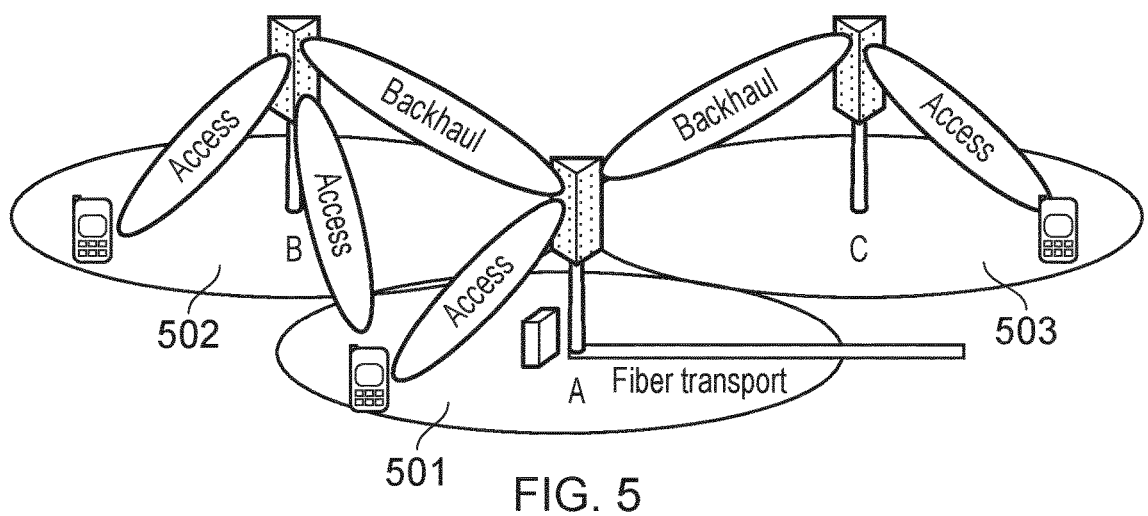
FIG. 5 is reproduced from [3], and provides a first example of an Integrated Access and Backhaul (IAB) deployment scenario.

FIG. 5 shows the scenario presented in [3], where a backhaul link is provided from cell site A 501 to cells B 502 and C 504 over the air. It is assumed that cells B 502 and C 504 have no wired backhaul connectivity. Considering the CU/DU split architecture in NR as described above, it can be assumed that all of cells A 501, B 502 and C 504 have a dedicated DU unit and are controlled by the same CU.

Several architecture requirements for IAB are laid out in [4]. These include the support for multiple backhaul hops, that topology adaptation for physically fixed relays shall be supported to enable robust operation, minimisation of impact to core network specifications, consideration of impact to core networking signaling load, and Release 15 NR specifications should be reused as much as possible in the design of the backhaul link, with enhancements considered.

Figure 6A:
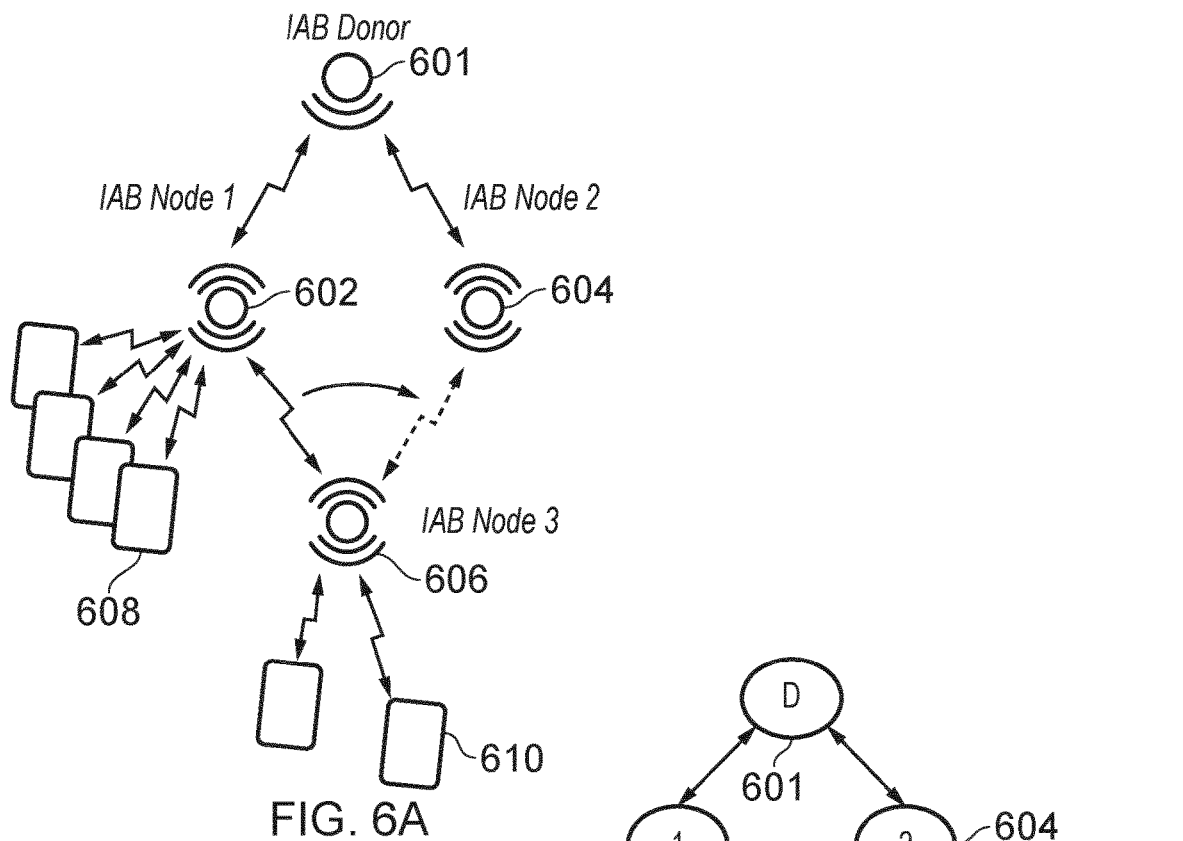
FIG. 6A is reproduced from [5], and provides a second example of an IAB deployment scenario in which there are multiple candidate routes each comprising multiple hops from the end node to the donor node.

FIG. 6A is reproduced from [5], and shows an example of a wireless communications system comprising a plurality of IAB-enabled nodes, which may for example be TRPs forming part of an NR network. These comprise an IAB donor node 601 which has a connection to the core network, two IAB nodes (a first IAB node 602 and a second IAB node 604) which have backhaul connections to the IAB donor node 601, and a third IAB node 606 (or end IAB node) which has a backhaul connection to each of the first IAB node 602 and the second IAB node 604. Each of the first IAB node 601 and third IAB node 606 has wireless access connections to UEs 608 and 610 respectively. As shown in FIG. 6A, originally the third IAB node 606 may communicate with the IAB donor node 601 via the first IAB node 602. After the second IAB node 604 emerges, there are now two candidate routes from the third IAB node 606 to the IAB donor node 601; via the first IAB node 602 and via the new second IAB node 604. The new candidate route via the second IAB node 604 will play an important role when there is a blockage in the first IAB node 602 to IAB donor node 604 links Hence, knowing how to manage the candidate routes efficiently and effectively is important to ensure timely data transmission between relay nodes, especially when considering the characteristics of wireless links.

In the case that the link between the first IAB node 602 and the third IAB node 606 is deteriorating, or the first IAB node 602 becomes overloaded, one of the nodes in the system (this could be the donor node 601 or the first IAB node 602 itself) will need to make a decision to change the route from the third IAB node 606 to the IAB donor node 601 from that via the first IAB node 602 to that via the second IAB node 604.

In FIG. 6A, only the IAB Donor gNB 601 has a fixed line backhaul into the core network. It should be assumed in this case that the traffic from all the UEs 610 within the third IAB node's 606 coverage is backhauled firstly to the first IAB node 602. This backhaul link must compete for capacity on the component carrier serving the first IAB Node 602 with all the UEs 608 within the coverage area of the first IAB Node 602. In the relevant art, the first IAB Node 602 in such a system as that of FIG. 6A is called a "hop"—it relays communications between the end (third) IAB node 606 and the donor IAB node 601. The backhaul link to the first IAB Node 602 requires enough capacity to support the traffic from all the UEs 610, bearing in mind that some of these may have stringent quality of service (QoS) requirements that translate into high traffic intensities.

Figure 6B:
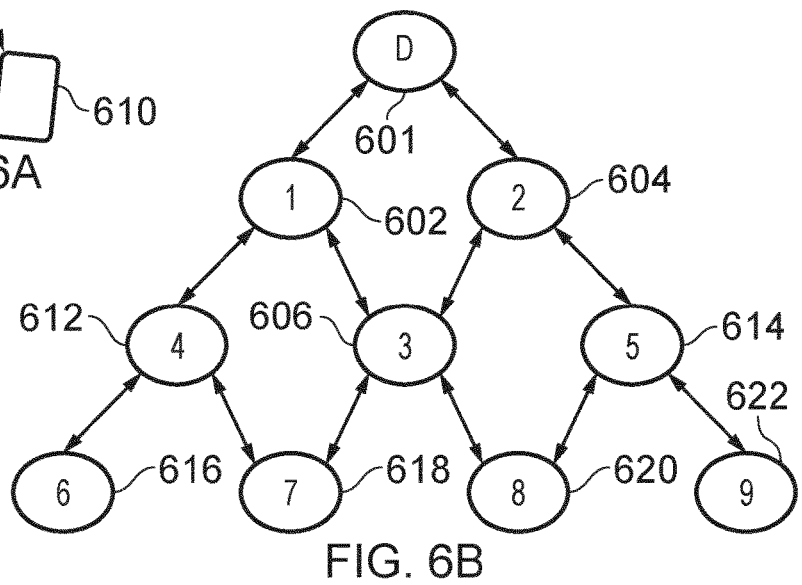
FIG. 6B is an extended version of FIG. 6A, providing a third example of an IAB deployment scenario in which there are multiple candidate routes each comprising multiple hops from the end node to the donor node.

FIG. 6B is an extended version of FIG. 6A, and shows what happens when there are multiple layers of IAB nodes in the deployment scenario. In the example of FIG. 6A, the third IAB node 606 is the child node of the first IAB node 602, and the first IAB node 602 may be the parent node of the third IAB node 606. However, a parent node may not necessarily be the next node up (i.e. one hop in the uplink direction) towards the IAB donor node 601. A parent node may be more than one hop away from its child node or children nodes, and is in a general sense configured to allocate uplink communications resources to the child node. For example, the donor IAB node 601 may in fact be the parent node of the third IAB node 606. This is shown with greater clarity in FIG. 6B.

In FIG. 6B, in addition to IAB node 601, 602, 604 and 606 as shown in FIG. 6A, there are additional IAB nodes 612 and 614 at the same layer or level of the network as IAB node 606. Below these are IAB nodes 616, 618, 620 and 622, which are now end nodes, in that they have no downlink backhaul connections to other IAB nodes. Here, it could be that the first IAB node 602 is still the parent of the third IAB node 606, but may also be the parent of IAB node 612. Further, the first IAB node 602 may be the parent of IAB nodes 616, 618 and 620 too, or may be a grandparent node to these nodes if nodes 606 and 612 are their parents. Furthermore, some child nodes may have multiple parent nodes, and can select from between them when transmitted uplink data in dependence on certain criteria, such as relative link qualities between the child node and its multiple parent nodes, or a relative load status between the parent nodes, for example.

Various architectures have been proposed in order to provide the IAB functionality. The below described embodiments of the present technique are not restricted to a particular architecture. However, a number of candidate architectures which have been considered in, for example, 3GPP document [6] are described below.

Figure 7:
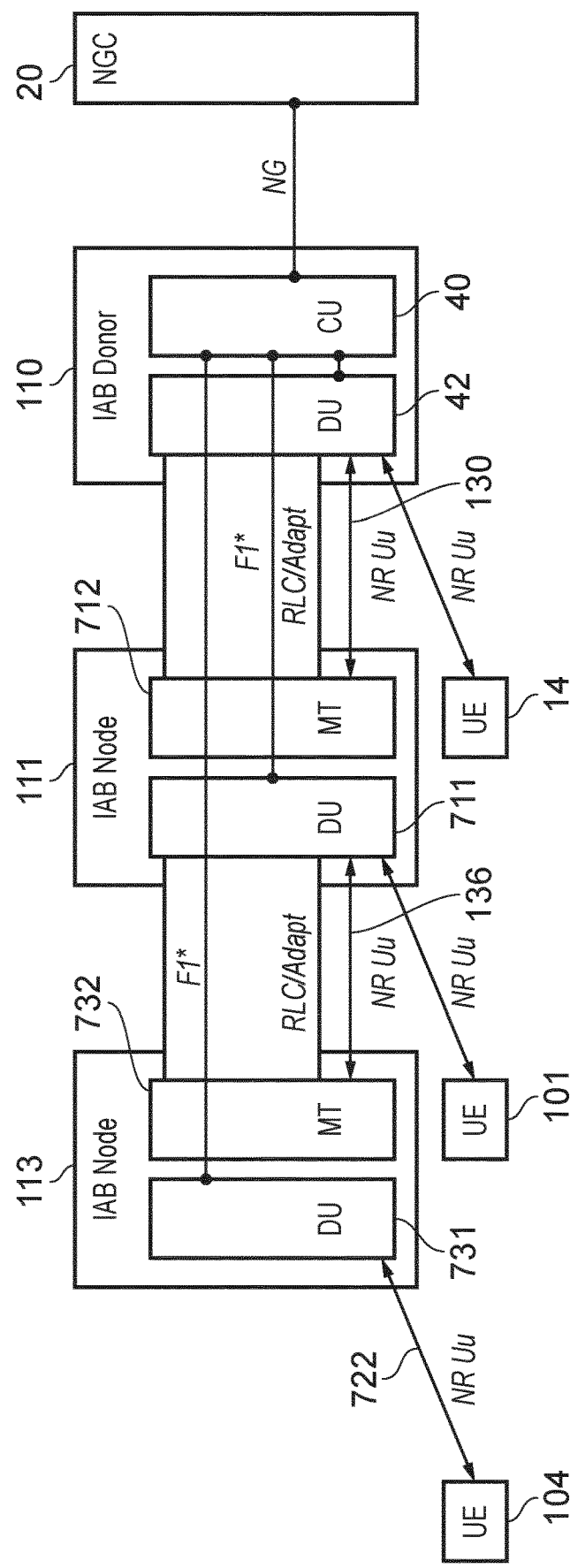
FIG. 7 is a block diagram illustrating a first possible network architecture for providing a wireless backhaul by means of IAB in a wireless telecommunication network which may be configured to operate in accordance with certain embodiments of the present disclosure.

FIG. 7 illustrates one possible architecture, sometimes referred to as "Architecture 1 a", by which the donor Node 110, the Node 1 111 and the Node 3 113 may provide a wireless backhaul to provide connectivity for the UEs 104, 101, 14.

In FIG. 7, each of the infrastructure equipment acting as an IAB nodes 111, 113 and the donor node 110, includes a distributed unit (DU) 42, 711, 731 which communicates with the UEs 14, 101, 104 and (in the case of the DUs 42, 511 associated with the donor node 110 and the Node 1 111) with the respective downstream IAB nodes 111, 113. Each of the IAB nodes 111, 113 (not including the donor node 110) includes a mobile terminal (MT) 712, 732, which includes a transmitter and receiver (not shown) for transmitting and receiving data to and from the DU of an upstream IAB node and an associated controller (not shown). The inter-node wireless communications links 130, 136 may be in the form of new radio (NR) "Uu" wireless interface. The mobile terminals 712, 732 may have substantially the same functionality as a UE, at least at the access stratum (AS) layer. Notably, however, an MT may not have an associated subscriber identity module (SIM) application; a UE may be conventionally considered to be the combination of an MT and a SIM application.

The Uu wireless interfaces used by IAB nodes to communicate with each other may also be used by UEs to transmit and receive data to and from the DU of the upstream IAB node. For example, the Uu interface 720 which is used by the Node 1 111 for communication with the donor node 110 may also be used by the UE 14 to transmit and receive data to and from the donor node 110.

Similarly, an end node (such as the Node 3 113) may provide a Uu wireless interface 722 for the fourth UE 104 to communicate with the DU 731 of the Node 3 113.

Figure 8:
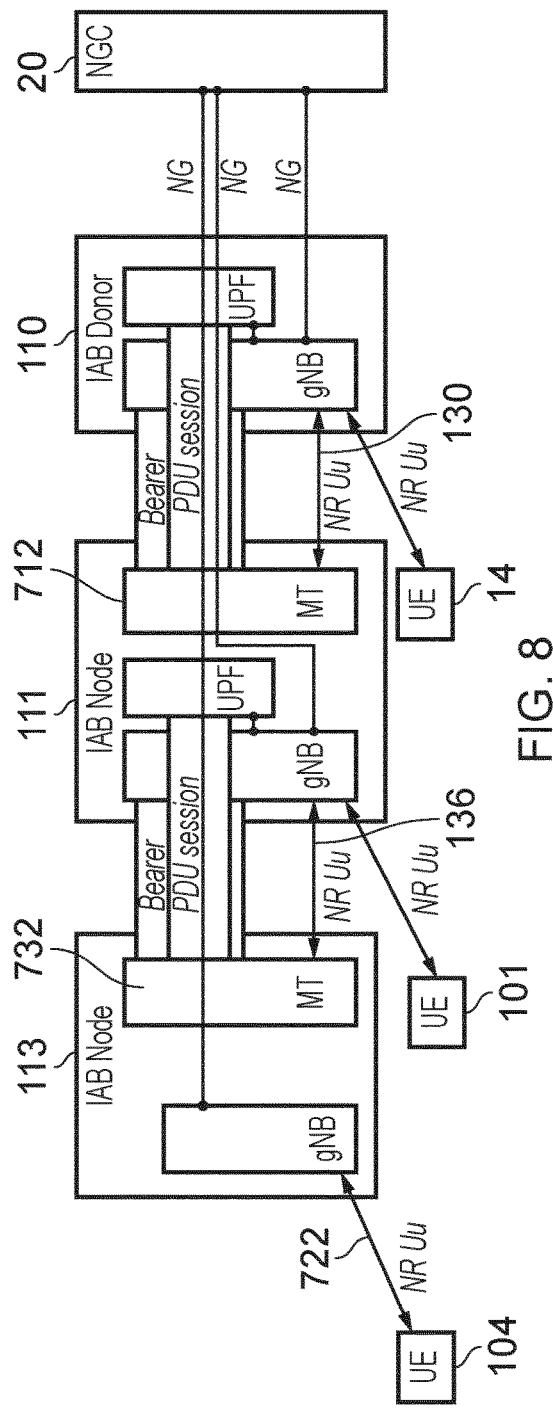
FIG. 8 is a block diagram illustrating a second possible network architecture for providing a wireless backhaul by means of IAB in a wireless telecommunication network which may be configured to operate in accordance with certain embodiments of the present disclosure.
Figure 9:
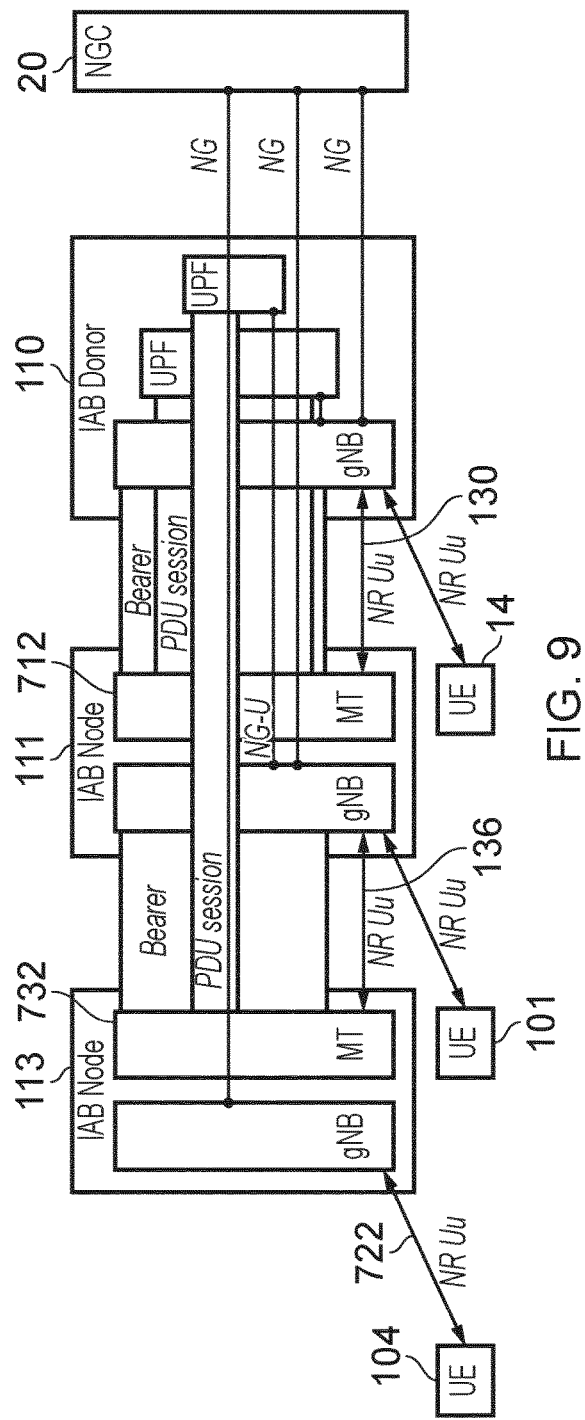
FIG. 9 is a block diagram illustrating a third possible network architecture for providing a wireless backhaul by means of IAB in a wireless telecommunication network which may be configured to operate in accordance with certain embodiments of the present disclosure.

Alternative candidate architectures for the provision of IAB are provided in FIG. 8 and FIG. 9, sometimes referred to as "Architectures 2a and 2b" respectively. In both FIG. 8 and FIG. 9, each IAB node includes a gNB function, providing a wireless access interface for the use of downstream IAB nodes and wireless communications devices. It should be appreciated that, although not shown in FIGS. 8 and 9, the gNB of each IAB donor 110 comprises a CU and a DU.

FIG. 9 differs from FIG. 7 in that, in FIG. 7, PDU sessions are connected end-on-end to form the wireless backhaul; in FIG. 9, PDU sessions are encapsulated so that each IAB node may establish an end-to-end PDU session which terminates at the IAB donor node 110.

Mesh Networks

A mesh network is a self-organised, non-hierarchical network comprising a plurality of infrastructure nodes. Each node can act as routers and forward traffic to and receive traffic from other nodes of the mesh network, from which they may be dynamically connected either directly or via one or more further nodes. Different types of routing protocols, such as proactive routing, reactive routing and hybrid routing, are discussed in mesh network as how to find a route between nodes in an efficient way is crucial to guarantee the performance of mesh network. The proactive protocol keeps a constant discovery process, where the nodes of the mesh network automatically inform each other of route (path) changes. Such a routing protocol is more resilient and capable of recovering from a failure. Proactive protocols perform better in static scenarios, in which the network paths rarely or never change. Instead, the reactive protocol establishes routes on demand. For each connection a node has, it is required to ask the whole network to search for the correct path. As a result, reactive networks scale better, but take more time to establish connections because paths may not be known beforehand. The hybrid protocol inherits characteristics from proactive and reactive protocols. Such hybrid protocols are often used for more specific cases where the proactive and reactive downsides are very pronounced or unwanted. Hybrid protocols adjust to conditions where either technique is favourable. Another way in which mesh networks can relay messages is using a flooding technique, where each node forwards a received packet along every link it has with another node, except the one via which it received the packet. However, such a flooding technique, while effective in terms of speed and simplicity, is costly and inefficient in terms of bandwidth usage.

Up to now, research on routing protocols for mesh network has primarily focused on how to establish and update routes between nodes, and has seldom addressed the differentiation between different routes. The manner in which an optimum route between nodes is established and selected according to different service requirements or to guarantee an expected QoS is especially important to telecommunication networks.

Furthermore, in conventional mesh networks, there is no concept of mesh zones, and each node is deemed to be independent. But in certain types of mesh networks, each node may not be independent. For example, in an IAB network, the IAB nodes may physically and/or logically belong to one donor node, such as a donor node as shown in FIGS. 7, 8 and 9 which has both a DU and CU. Here, when a mesh network is applied to IAB networks—which appears to be promising given the nodal nature of IAB networks— the deployment of donor nodes which are different to non-donor IAB nodes as described herein indicates that there may be some sort of mesh boundary between each of a plurality of mesh zones, where each IAB node may belong to one specific donor node. In the context of IAB, a mesh zone may be defined as a portion of a mesh network that "belongs to" and contains a single CU, and all IAB nodes that are connected to the core network via that CU. That is, in the context of IAB, a mesh zone may be defined as a portion of the mesh network that "belongs to" and contains a single donor node (which itself comprises a CU and DU), and all IAB nodes that are connected to the core network via that donor node.

Figure 10:
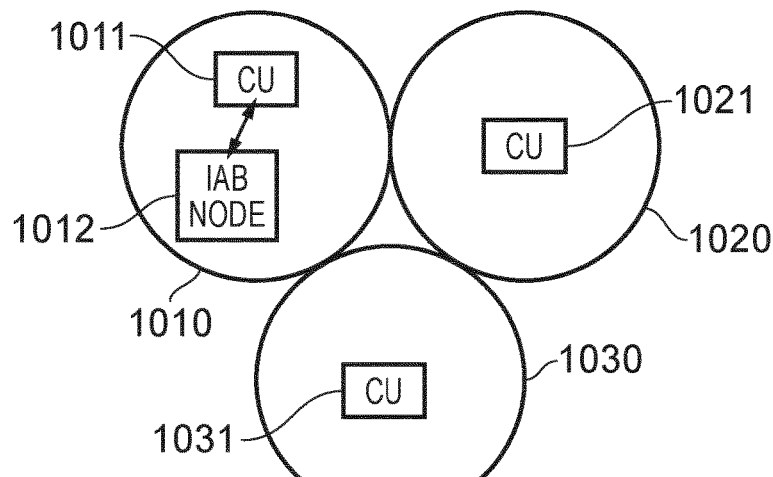
FIG. 10 shows an example of mesh zones in a mesh network in accordance with certain embodiments of the present disclosure.

An example of a mesh network is shown in FIG. 10, where three mesh zones 1010, 1020, 1030 are each controlled by a CU node 1011, 1021, 1031 connected to the core network (not shown). An IAB node 1012 in one of the zones 1010 is connected to the core network via the CU node 1011 controlling that zone. Although the mesh zones 1010, 1020, 1030 are shown as separate and discrete areas in FIG. 10, there may be some cross-over between mesh zones, which may be of any shape and size which is not necessarily the same as other mesh zones in the mesh network. These mesh zones may be geographical areas, or they may be logical zones, or may be a combination of the two. Those skilled in the art would be aware that mesh zones are not necessary in normal mesh networks where each node is independent and the mesh network is non-hierarchical.

Thus, with regard to the above description of a mesh network particularly when applied to an IAB network, determining how to route packets efficiently between IAB mesh zones is a new problem. More broadly, and within the scope of the present disclosure, where the concept of mesh zones may be applied to mesh networks other than for IAB nodes (for example, tree networks or directed acyclic graph (DAG) networks), or indeed to non-mesh nodal networks (for IAB or the like) that otherwise employ particular portions or zones, determining how to route packets efficiently between such portions or zones is a problem that requires solutions. Embodiments of the present technique seek to provide solutions to such problems.

Mobility Between IAB Mesh Zones

FIG. 11 shows a part schematic, part message flow diagram of communications in a wireless communications network 1100 in accordance with embodiments of the present technique. The wireless communications network 1100 comprises a first infrastructure equipment 1106 and a plurality of other infrastructure equipment 1108 (only one of the other infrastructure equipment shown in FIG. 11 for simplicity). The first infrastructure equipment 1106 is configured to communicate with one or more of the plurality of other infrastructure equipment 1108 and the first infrastructure equipment 1106 is configured to communicate with a core network part 1104 of the wireless communications network 1100 via a first central unit node 1101 communicatively coupled 1116 to the core network part 1104, wherein the first central unit node 1101 controls a first zone of the wireless communications network 1100.

The first infrastructure equipment 1106 comprises transceiver circuitry 1106a and controller circuitry 1106b which are configured in combination to perform measurements 1130 on signals received 1131 from one or more of the first central unit node 1101 and the one or more of the plurality of other infrastructure equipment 1108, to transmit 1140, to the first central unit node 1101, a measurement report comprising an indication of the measurements performed 1130 on the received signals 1131, to receive 1150, from the first central unit node 1101, a command signal comprising an indication that the first infrastructure equipment 1106 should communicate with the core network part 1104 via a second central unit node 1102 communicatively coupled to the core network part 1104 instead of the first central unit node 1101, wherein the second central unit node 1102 controls a second zone of the wireless communications network 1100, wherein the command signal 1150 indicates that the first central unit node 1101 is to perform a handover procedure 1151 with the second central unit node 1102, the handover procedure 1151 comprising the first central unit node 1101 transmitting configuration information of the first infrastructure equipment 1106 to the second central unit node 1102, and to communicate 1160 with the core network part 1104 via the second central unit node 1102.

The first infrastructure equipment 1106 may be an IAB node in an IAB network that is configured to communicate with the one or more of the plurality of other infrastructure equipment 1108 via a backhaul communications link 1112 by periodically transmitting a plurality of beams (or Transmission Configuration Indication (TCI) states) of radio signals in at least one of different spatial directions and at different times. The first infrastructure equipment 1106 (and each of the plurality of other infrastructure equipment 1108) may be configured to communicate with one or more communications devices 1120 via an access link 1114. The first central unit node 1101 and the second central unit node 1102 may be configured to communicate via the core network 1104 to which they are both connected, or may communicate with each other via a direct link 1118. Each of the first central unit node 1101, the second central unit node 1102 and the plurality of other infrastructure equipment 1108 may each comprise, respectively, transceiver circuitry 1101*a* and controller circuitry 1101*b*, transceiver circuitry 1102*a* and controller circuitry 1102*b*, and transceiver circuitry 1108*a* and controller circuitry 1108*b*.

In at least some embodiments of the present technique, the first infrastructure equipment 1106 is configured to communicate with the core network part 1104 by transmitting signals to and/or receiving signals from the first central unit node 1101 or the second central unit node 1102 (depending on whether the handover procedure 1151 has been undergone) via one or more of the plurality of other infrastructure equipment 1108 acting as relay nodes forming a communications path. Although not shown in FIG. 11, the skilled person would understand that such a communications path could comprise any number of hops (i.e. any number of relay nodes in between the first infrastructure equipment 1106 and the first or second central unit nodes 1101, 1102). Here, one of the relay nodes may be a donor node, where the donor node either comprises a first distributed unit node and the first central unit node 1101 or comprises a second distributed unit node the second central unit node 1102 (depending on whether the handover procedure 1151 has been undergone), the first infrastructure equipment 1106 configured to receive, from the donor node, allocations of radio resources for communicating with the relay nodes and with the first central unit node 1101 or the second central unit node 1102.

In at least some embodiments of the present technique, the first central unit node 1101 and the first distributed unit node are each comprised together within a first of a plurality of donor nodes of the wireless communications network 1100, and similarly, the second central unit node 1102 and the second distributed unit node are each comprised within a second of the plurality of donor nodes. Here, the first infrastructure equipment 1106 may be configured to receive, from the first donor node or the second donor node (depending on whether the handover procedure 1151 has been undergone), allocations of radio resources for communicating with the one or more of the plurality of other infrastructure equipment 1108 and with the first central unit node 1101 or the second central unit node 1102.

Furthermore, or alternatively, one of the relay nodes (or indeed the donor node itself) may be a parent node communicatively coupled to the first infrastructure equipment 1106 via a backhaul communications link 1112 and configured to allocate radio resources to the first infrastructure equipment 1106, the radio resources forming part of a set of radio resources allocated to the parent node by such a donor node of the wireless communications network 1100. Additionally, the first infrastructure equipment 1106 may have a connection to more than one parent node.

Essentially then, embodiments of the present technique provide solutions for the handling of IAB nodes or the like which are mobile and move between neighbouring mesh zones, where such mesh zones may be defined—as described above—according to their CU association. Embodiments of the present technique may also provide solutions for the handling of IAB nodes which are static, but where a route change is required across CUs e.g. due to radio link failure (RLF), or a service requirement triggered route change, etc. Embodiments of the present technique propose inter-CU IAB node handover procedures, also considering the group mobility of mobile terminals associated with the IAB node involved in the handover procedures. That is, the measurement report may comprise information associated with group mobility of the one or more communications devices. As has been mentioned above, and as would be appreciated by those skilled in the art, embodiments of the present technique comprise the concept of topology and routing issues of mesh networks, which may be IAB mesh networks or may be mesh networks other than for IAB nodes (for example, tree networks or directed acyclic graph (DAG) networks), or indeed comprise non-mesh nodal networks (for IAB or the like) that otherwise employ particular portions or zones.

At least some embodiments of the present technique target the scenario that a route is needed between neighbour mesh zone which may belong to different IAB donors or CUs; for example there may be two IAB nodes that are physically close to each other but belonging to different IAB donors/CUs, or there may be an IAB node that moves from a zone controlled by one CU to a zone controlled by another CU, etc. UEs may have different routes for different services in the source mesh zone consisting of a plurality of IAB nodes, where each route involves a different subset of these IAB nodes. For example, a UE attached to an IAB node (e.g. IAB node 1012 of FIG. 10) may have both eMBB and URLLC services active in a source mesh zone (e.g. mesh zone 1010 of FIG. 10), and may have different number of hops for each of them. For example, the eMBB service may involve a route to the controlling CU and thus core network having a greater number of hops where enough bandwidth is available, and URLLC service may involve a route to the core network having a lower number of hops to achieve low latency and reliability. These service-specific configurations need to be maintained in a target mesh zone (e.g. mesh zone 1020 of FIG. 11) when the IAB node to which the UE is attached undergoes handover from the source mesh zone to the target mesh zone. Therefore, handover signaling must ensure that such service-specific configurations are maintained at the new CU and are not lost. If the mobile terminal of this IAB node itself is in the mesh zone of upstream IAB nodes on one of its routes, then the same handling as explained above should apply i.e. IAB MT and UE behaviour is the same.

Figure 12:
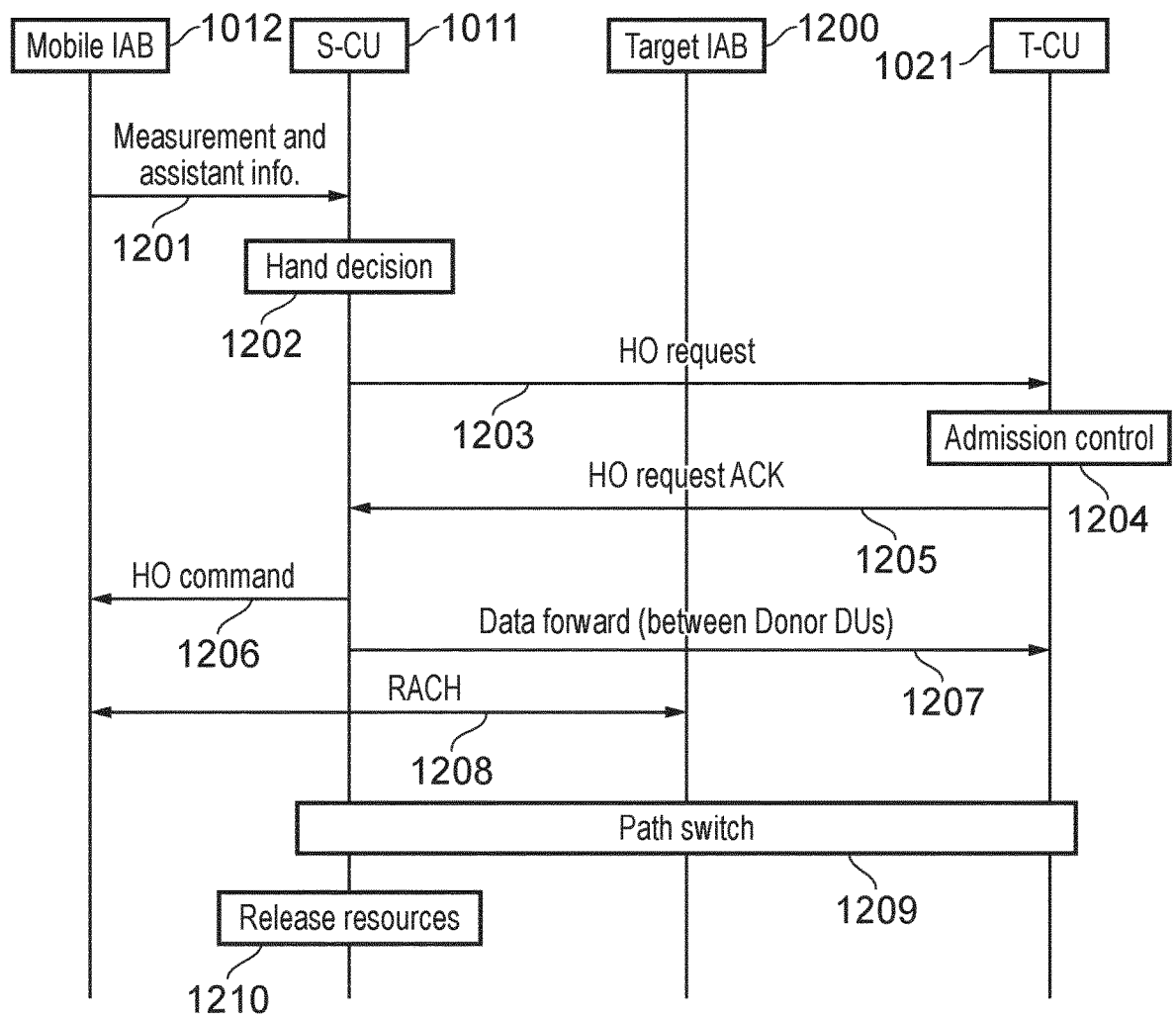
FIG. 12 shows an example of inter-CU handover in accordance with embodiments of the present technique.

FIG. 12 shows an example of inter-CU handover in accordance with at least some embodiments of the present technique. The data transmission is via inter-donor DU. Whether two donor DUs can be connected with each other can be configured by their CUs. Each IAB donor DU will maintain a route table to other IAB donors. For the mobile IAB node case, inter-CU handover may be needed if, for example, a mobile IAB node moves to another IAB CU. The procedure is as follows.

Firstly, the mobile IAB node 1012 (which may in the following description be deemed equivalent or analogous to the first infrastructure equipment 1106 of FIG. 11 and indeed which is described below interchangeably with the first infrastructure equipment 1106 of FIG. 11) may perform measurements on received signals, and generate a measurement report which it transmits 1201 to the source IAB CU 1011. Based on this measurement report, the source IAB CU 1011 makes a handover decision 1202, in which it identifies that the mobile IAB node 1012 (or indeed another IAB node indicated by the measurement report received 1201 from the mobile IAB node 1012) is moving outside of its control area—i.e. the zone 1010—and identifies the target IAB CU 1021 on the basis of the zone/control area that the source IAB CU 1011 determines the mobile IAB node 1012 is moving into. Along with the measurement report, the mobile IAB node 1012 may transmit assistance or additional information for the source IAB CU 1011, such as information on MTs/UEs that are going to move together with the mobile IAB node 1012, for example the number of MTs, their on-going services, etc.

The measurement report may indicate that a measured characteristic of a communications link between any two nodes on a first communications path between the first infrastructure equipment and the first central unit node is below a predetermined threshold. These two nodes may include the first infrastructure equipment and the first central unit node themselves in a case where no relay nodes are provided on the route between them. Here, the measured characteristic may be at least one of a relative quality of signals received and/or transmitted over the communications link, a power with which signals are received and/or transmitted over the communications link, and an error rate of signals received and/or transmitted over the communications link.

Alternatively, or in addition, the measurement report may indicate (specifically in the case that the IAB node is a mobile IAB node) that the first infrastructure equipment is moving outside of the first zone and moving inside of the second zone.

Alternatively, or in addition, the measurement report may indicate that the first communications device is to switch from communicating with the first central unit node via a first communications path to communicating with the second central unit node via a second communications path formed by a different one or more of the plurality of other infrastructure equipment acting as relay nodes than the first communications path.

The source IAB CU 1011 will negotiate with the target IAB CU 1021 regarding whether the handover of the IAB node 1012 is acceptable. This may involve transmitting a handover request message 1203 to the target IAB CU 1021, which performs admission control 1204 and determines whether the handover of the IAB node 1012 is acceptable. If the handover is deemed acceptable, target IAB CU 1021 will send a handover request acknowledgment message 1205 comprising a re-configuration message to the source IAB CU 1011 (taking any information received from the source IAB CU 1011 into consideration). In other words, the first central unit node is configured, before transmitting the command signal to the first infrastructure equipment, to transmit a handover request signal to the second central unit node to determine whether the first central unit node can perform the handover procedure, and to receive a handover acknowledgment signal from the second central unit node indicating that the first central unit node is to transmit to the command signal to the first infrastructure equipment and the first central unit node is to perform the handover procedure.

Here, specifically for IAB networks, the target IAB CU 1021 may identify a potential IAB parent node 1200 or IAB parent node candidates for the mobile IAB node 1012; here the source IAB CU 1011 will send the received measurement report 1201 or an indication of the contents thereof to the target IAB CU 1021, and from the measurement report, the target IAB CU 1021 can deduce which node or candidate nodes may be the potential parent IAB node 1200 for the mobile IAB node 1012. Such parent node information should then be included in the handover request acknowledgment message/re-configuration message 1205. In other words, the handover acknowledgment signal may indicate a new parent node (or a plurality of candidate parent nodes) for the first infrastructure equipment, the new parent node being an infrastructure equipment within the second zone communicatively coupled to the second central unit node Furthermore, there may be a need to share route information between the source IAB CU 1011 and the target IAB CU 1021; for example, as described above, the target IAB CU 1021 may need to configure different routes for different services and so such information provided by the source IAB CU 1021 (for example as part of the handover request message 1203) will aid the target IAB CU 1021 in configuring such routes. This route information may be DRB specific.

The source IAB CU 1011 may send a handover command 1206 comprising a re-configuration message to the mobile IAB node 1012 and will tell the IAB donor DU to suspend all the data targeted to this IAB node 1012 and forward 1207 this data to the target IAB donor DU. In other words, the handover procedure comprises the first central unit node controlling the first distributed unit node to forward data intended for transmission to the first infrastructure equipment to the second distributed unit node for subsequent transmission of the data to the first infrastructure equipment by the second distributed node. Here, the re-configuration message may be RRC signaling between the CU 1011 and the MT of the mobile IAB node 1012, or alternatively, the re-configuration message may be FLAP signaling over the F1 interface between the CU and the DU of the IAB node 1012.

The command signal may then comprise an indication that the first infrastructure equipment is to communicate with the core network part via the second central unit node via at least one of a new parent node (if one is indicated in the handover acknowledgment signal) and a routing table comprising one or more new communications paths/routes (between the first infrastructure equipment and either the first central unit node or the second central unit node) that may be different to a communications path presently used by the first infrastructure equipment to communicate with the first central unit node.

The mobile IAB node 1012 may, in response to receiving the handover command 1206, perform a random access procedure 1208 to connect to the target IAB node 1200, and thus finally connect to the target IAB CU 1021. In other words, the first infrastructure equipment is configured, before communicating with the core network part via the second central unit node via the new parent node, to perform a random access procedure with the new parent node. Those skilled in the art would note that, if the time difference between the source IAB CU 1011 and the target IAB CU 1021 is known or estimated in advance, a RACH-less procedure can be applied in which the target IAB parent node 1200 is aware that the mobile IAB node 1012 is connecting to it. The application of this RACH-less procedure may be based on determining that a timing advance of the target CU 1021 is zero or is approximately zero or is below a predetermined or signaled threshold which may be approximately zero.

The source IAB CU 1011 and the mobile IAB node 1012 will update their routes accordingly, along with the target IAB node 1200 and the target IAB CU 1021 as part of a path switch 1209. Finally, the source IAB CU 1210 may release resources allocated to the mobile IAB node 1012 in order to allow those resources to be allocated to other IAB nodes, as it is now the role of the target IAB CU 1021 to control the allocation of resources to the mobile IAB node 1012.

For MTs or UEs moving together with the mobile IAB node 1012, the RACH procedure can be omitted; that is a RACH less procedure is used, but the RRC connection should be renewed to the new target IAB CU 1021. Furthermore, this RRC connection may be implemented using a group RRC connection setup request transmitted from the mobile IAB node 1012 to the target IAB CU 1021.

In some embodiments of the present technique, sidelink communication between the IAB nodes belonging to different mesh zones may be utilized to further enhance the mobility performance. That is, some non-donor IAB node pairs in different mesh zones (for example in the boundary areas of these mesh zones) may have a direct sidelink already established if this is allowed and configured by their respective IAB donor nodes. Although such sidelinks can be utilized by static IAB nodes, specifically for the mobile IAB node case, direct data transmission between IAB node pairs (e.g. a mobile IAB node in a first mesh zone and a mobile IAB node in a second mesh zone) can be continued via their direct sidelink in order to avoid the transmission interruption during handover and thus ensure the efficient transmission of data. In other words, the first infrastructure equipment is configured, during the handover procedure, to communicate directly via a sidelink interface with an infrastructure equipment within the second zone communicatively coupled to the second central unit node, and it should be appreciated that this sidelink communication can be effected between either the DU parts of paired IAB nodes or the MT parts of paired IAB nodes.

In at least some embodiments of the present technique, the source and target zones operate on the same frequency; that is, the donor node/CU which control each of the source zone and target zone, and the other IAB nodes within those zones, communicate signals within a same or substantially similar bandwidth as each other. Due to this, whilst the handover configuration is provided by RRC signaling (or F1AP signaling) in the manner described above with respect to other embodiments of the present technique, it is possible to perform the actual inter-cell handover execution using physical layer signaling.

For example, where each IAB node in an IAB network is configured to communicate with the other IAB nodes in the IAB network via a backhaul communications link by periodically transmitting a plurality of beams or TCI states of radio signals in at least one of different spatial directions and at different times, beams from both the source and target zones may be added to the TCI states and are activated by the IAB node/UEs undergoing handover when certain criteria are met (these criteria being similar to or the same as other criteria described herein, i.e. relating to the described measurements and/or measurement reports). In other words, signals are transmitted and received by infrastructure equipment within the first zone using a same set of frequencies as signals transmitted and received by infrastructure equipment within the second zone, and wherein the handover procedure is performed between the first central unit node and the second central unit node using physical layer signaling.

Flow Chart Representation

Figure 13:
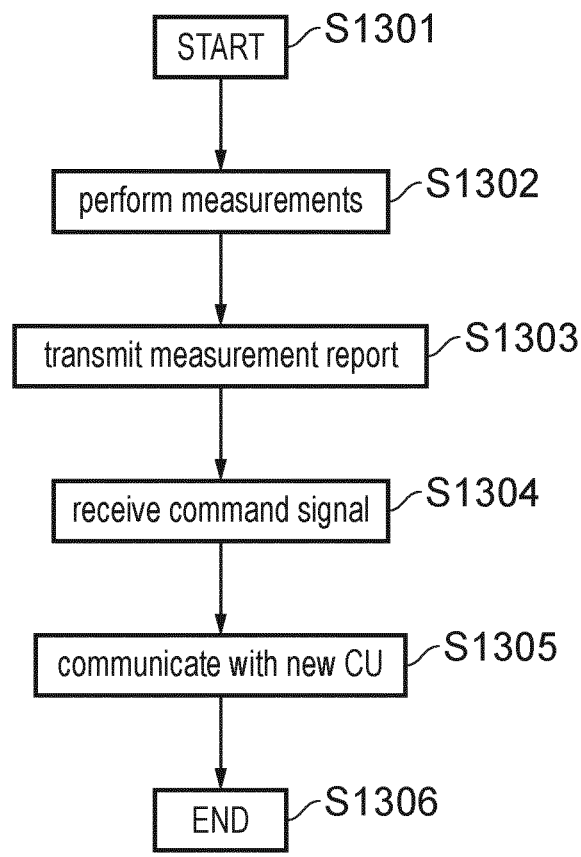
FIG. 13 shows a flow diagram illustrating a process of communications in a communications system in accordance with embodiments of the present technique.

FIG. 13 shows a flow diagram illustrating a process of communications in a communications system in accordance with embodiments of the present technique. The process shown by FIG. 13 is a method of operating a first infrastructure equipment forming part of a wireless communications network comprising a plurality of other infrastructure equipment, the first infrastructure equipment being configured to communicate with one or more of the plurality of other infrastructure equipment and the first infrastructure equipment being configured to communicate with a core network part of the wireless communications network via a first central unit node communicatively coupled to the core network part, wherein the first central unit node controls a first zone of the wireless communications network.

The method begins in step S1301. The method comprises, in step S1302, performing measurements on signals received from one or more of the first central unit node and the one or more of the plurality of other infrastructure equipment. In step S1303, the method comprises transmitting, to the first central unit node, a measurement report comprising an indication of the measurements performed on the received signals. In step S1304, the process comprises receiving, from the first central unit node, a command signal comprising an indication that the first infrastructure equipment should communicate with the core network part via a second central unit node communicatively coupled to the core network part instead of the first central unit node, wherein the second central unit node controls a second zone of the wireless communications network, wherein the command signal indicates that the first central unit node is to perform a handover procedure with the second central unit node, the handover procedure comprising the first central unit node transmitting configuration information of the first infrastructure equipment to the second central unit node. In step S1305, the process involves communicating with the core network part via the second central unit node. The process ends in step S1306.

Those skilled in the art would appreciate that the method shown by FIG. 13 may be adapted in accordance with embodiments of the present technique. For example, other intermediate steps may be included in the method, or the steps may be performed in any logical order.

Though embodiments of the present technique have been described largely by way of the example system shown in FIG. 11 and the IAB inter-CU handover process shown by FIG. 12, it would be clear to those skilled in the art that the embodiments of the present technique could be equally applied to other systems, which may not necessarily be IAB networks. Furthermore, although FIGS. 11 and 13 relate to the present technique from the viewpoint of the first infrastructure equipment (i.e. IAB node), embodiments of the present technique may be equally applied to the source CU, target CU, mobile communications network as a whole, and methods of operating or circuitries used for the implementation of any of the above, as is defined by the appended claims.

Those skilled in the art would also appreciate that such infrastructure equipment, central and distributed unit nodes and/or wireless communications networks as herein defined may be further defined in accordance with the various arrangements and embodiments discussed in the preceding paragraphs. It would be further appreciated by those skilled in the art that such infrastructure equipment, central and distributed unit nodes and wireless communications networks as herein defined and described may form part of communications systems other than those defined by the present invention.

The following numbered paragraphs provide further example aspects and features of the present technique:

Paragraph 1. A first infrastructure equipment forming part of a wireless communications network comprising a plurality of other infrastructure equipment, the first infrastructure equipment being configured to communicate with one or more of the plurality of other infrastructure equipment and the first infrastructure equipment being configured to communicate with a core network part of the wireless communications network via a first central unit node communicatively coupled to the core network part, wherein the first central unit node controls a first zone of the wireless communications network, wherein the first infrastructure equipment comprises transceiver circuitry and controller circuitry which are configured in combination to perform measurements on signals received from one or more of the first central unit node and the one or more of the plurality of other infrastructure equipment, to transmit, to the first central unit node, a measurement report comprising an indication of the measurements performed on the received signals, to receive, from the first central unit node, a command signal comprising an indication that the first infrastructure equipment should communicate with the core network part via a second central unit node communicatively coupled to the core network part instead of the first central unit node, wherein the second central unit node controls a second zone of the wireless communications network, wherein the command signal indicates that the first central unit node is to perform a handover procedure with the second central unit node, the handover procedure comprising the first central unit node transmitting configuration information of the first infrastructure equipment to the second central unit node, and to communicate with the core network part via the second central unit node.

Paragraph 2. A first infrastructure equipment according to Paragraph 1, wherein the first infrastructure equipment is configured to communicate with the one or more of the plurality of other infrastructure equipment via a backhaul communications link by periodically transmitting a plurality of beams of radio signals in at least one of different spatial directions and at different times.

Paragraph 3. A first infrastructure equipment according to Paragraph 2, wherein the first infrastructure equipment is configured to communicate with one or more communications devices via an access link.

Paragraph 4. A first infrastructure equipment according to any of Paragraphs 1 to 3, wherein the first infrastructure equipment is configured to communicate with the core network part by transmitting signals to and/or receiving signals from the first central unit node or the second central unit node via one or more of the plurality of other infrastructure equipment acting as relay nodes forming a communications path.

Paragraph 5. A first infrastructure equipment according to Paragraph 4, wherein one of the relay nodes is a donor node, the donor node either comprising a first distributed unit node and the first central unit node or comprising a second distributed unit node and the second central unit node, the first infrastructure equipment configured to receive, from the donor node, allocations of radio resources for communicating with the relay nodes and with the first central unit node or the second central unit node.

Paragraph 6. A first infrastructure equipment according to Paragraph 5, wherein the handover procedure comprises the first central unit node controlling the first distributed unit node to forward data intended for transmission to the first infrastructure equipment to the second distributed unit node for subsequent transmission of the data to the first infrastructure equipment by the second distributed node.

Paragraph 7. A first infrastructure equipment according to any of Paragraphs 4 to 6, wherein one of the relay nodes is a parent node communicatively coupled to the first infrastructure equipment via a backhaul communications link and configured to allocate radio resources to the first infrastructure equipment, the radio resources forming part of a set of radio resources allocated to the parent node by a donor node of the wireless communications network.

Paragraph 8. A first infrastructure equipment according to Paragraph 7, wherein the first infrastructure equipment is configured to identify, from the command signal, at least one of a new parent node and one or more new communications paths different to a first communications path currently used by the first infrastructure equipment to communicate with the first central unit node, wherein the new parent node is an infrastructure equipment within the second zone communicatively coupled to the second central unit node, and to communicate with the core network part via the second central unit node via at least one of the new parent node and one of the new communications paths. Paragraph 9. A first infrastructure equipment according to Paragraph 8, wherein the first infrastructure equipment is configured, before communicating with the core network part via the second central unit node via at least one of the new parent node and one of the new communications paths, to perform a random access procedure with the new parent node.

Paragraph 10. A first infrastructure equipment according to Paragraph 8 or Paragraph 9, wherein the first infrastructure equipment is configured, before communicating with the core network part via the second central unit node via at least one of the new parent node and one of the new communications paths, to determine that a timing advance for the second central unit node is approximately equal to zero, and to communicate, without first performing a random access procedure, with the core network part via the second central unit node via at least one of the new parent node and one of the new communications paths.

Paragraph 11. A first infrastructure equipment according to any of Paragraphs 4 to 10, wherein the measurement report indicates that a measured characteristic of a communications link between any two nodes on a first communications path between the first infrastructure equipment and the first central unit node is below a predetermined threshold.

Paragraph 12. A first infrastructure equipment according to Paragraph 11, wherein the measured characteristic is at least one of a relative quality of signals received and/or transmitted over the communications link, a power with which signals are received and/or transmitted over the communications link, and an error rate of signals received and/or transmitted over the communications link.

Paragraph 13. A first infrastructure equipment according to any of Paragraphs 4 to 12, wherein the measurement report indicates that the first communications device is to switch from communicating with the first central unit node via a first communications path to communicating with the second central unit node via a second communications path formed by a different one or more of the plurality of other infrastructure equipment acting as relay nodes than the first communications path.

Paragraph 14. A first infrastructure equipment according to any of Paragraphs 1 to 13, wherein the first central unit node and a first distributed unit node are each comprised within a first of a plurality of donor nodes of the wireless communications network, and the second central unit node and a second distributed unit node are each comprised within a second of the plurality of donor nodes, the first infrastructure equipment configured to receive, from the first donor node or the second donor node, allocations of radio resources for communicating with the one or more of the plurality of other infrastructure equipment and with the first central unit node or the second central unit node.

Paragraph 15. A first infrastructure equipment according to Paragraph 14, wherein the handover procedure comprises the first central unit node controlling the first distributed unit node to forward data intended for transmission to the first infrastructure equipment to the second distributed unit node for subsequent transmission of the data to the first infrastructure equipment by the second distributed node.

Paragraph 16. A first infrastructure equipment according to any of Paragraphs 1 to 15, wherein the measurement report indicates that the first infrastructure equipment is moving outside of the first zone and moving inside of the second zone.

Paragraph 17. A first infrastructure equipment according to any of Paragraphs 1 to 16, wherein the measurement report indicates that a measured characteristic of a communications link between the first infrastructure equipment and the first central unit node is below a predetermined threshold.

Paragraph 18. A first infrastructure equipment according to Paragraph 17, wherein the measured characteristic is at least one of a relative quality of signals received and/or transmitted over the communications link, a power with which signals are received and/or transmitted over the communications link, and an error rate of signals received and/or transmitted over the communications link.

Paragraph 19. A first infrastructure equipment according to any of Paragraphs 3 to 18, wherein the measurement report comprises information associated with group mobility of the one or more communications devices.

Paragraph 20. A first infrastructure equipment according to any of Paragraphs 1 to 19, wherein the first infrastructure equipment is configured, during the handover procedure, to communicate directly via a sidelink interface with an infrastructure equipment within the second zone communicatively coupled to the second central unit node.

Paragraph 21. A first infrastructure equipment according to any of Paragraphs 1 to 20, wherein signals are transmitted and received by infrastructure equipment within the first zone using a same set of frequencies as signals transmitted and received by infrastructure equipment within the second zone, and wherein the handover procedure is performed between the first central unit node and the second central unit node using physical layer signaling.

Paragraph 22. A method of operating a first infrastructure equipment forming part of a wireless communications network comprising a plurality of other infrastructure equipment, the first infrastructure equipment being configured to communicate with one or more of the plurality of other infrastructure equipment and the first infrastructure equipment being configured to communicate with a core network part of the wireless communications network via a first central unit node communicatively coupled to the core network part, wherein the first central unit node controls a first zone of the wireless communications network, wherein the method comprises performing measurements on signals received from one or more of the first central unit node and the one or more of the plurality of other infrastructure equipment, transmitting, to the first central unit node, a measurement report comprising an indication of the measurements performed on the received signals, receiving, from the first central unit node, a command signal comprising an indication that the first infrastructure equipment should communicate with the core network part via a second central unit node communicatively coupled to the core network part instead of the first central unit node, wherein the second central unit node controls a second zone of the wireless communications network, wherein the command signal indicates that the first central unit node is to perform a handover procedure with the second central unit node, the handover procedure comprising the first central unit node transmitting configuration information of the first infrastructure equipment to the second central unit node, and communicating with the core network part via the second central unit node.

Paragraph 23. Circuitry for a first infrastructure equipment forming part of a wireless communications network comprising a plurality of other infrastructure equipment, the circuitry being configured to communicate with one or more of the plurality of other infrastructure equipment and the circuitry being configured to communicate with a core network part of the wireless communications network via a first central unit node communicatively coupled to the core network part, wherein the first central unit node controls a first zone of the wireless communications network, wherein the circuitry comprises transceiver circuitry and controller circuitry which are configured in combination to perform measurements on signals received from one or more of the first central unit node and the one or more of the plurality of other infrastructure equipment, to transmit, to the first central unit node, a measurement report comprising an indication of the measurements performed on the received signals, to receive, from the first central unit node, a command signal comprising an indication that the first infrastructure equipment should communicate with the core network part via a second central unit node communicatively coupled to the core network part instead of the first central unit node, wherein the second central unit node controls a second zone of the wireless communications network, wherein the command signal indicates that the first central unit node is to perform a handover procedure with the second central unit node, the handover procedure comprising the first central unit node transmitting configuration information of the first infrastructure equipment to the second central unit node, and to communicate with the core network part via the second central unit node.

Paragraph 24. A first central unit node forming part of a wireless communications network comprising a plurality of infrastructure equipment, the first central unit node being communicatively coupled to the core network part, wherein the first central unit node controls a first zone of the wireless communications network, wherein the first central unit node comprises transceiver circuitry and controller circuitry which are configured in combination to receive, from a first of the plurality of infrastructure equipment, a measurement report comprising an indication of the measurements performed on signals received by the first infrastructure equipment from one or more of the first central unit node and one or more others of the plurality infrastructure equipment,
  to determine, based on the measurement report, that the first infrastructure equipment should communicate with the core network part via a second central unit node communicatively coupled to the core network part instead of the first central unit node, wherein the second central unit node controls a second zone of the wireless communications network,
  to transmit, to the first infrastructure equipment, a command signal comprising an indication that the first infrastructure equipment should communicate with the core network part via the second central unit node instead of the first central unit node, and
  to perform a handover procedure, indicated by the command signal, with the second central unit node, the handover procedure comprising transmitting configuration information of the first infrastructure equipment to the second central unit node.

Paragraph 25. A first central unit node according to Paragraph 24, wherein the first central unit node is configured, before transmitting the command signal to the first infrastructure equipment,
  to transmit a handover request signal to the second central unit node to determine whether the first central unit node can perform the handover procedure, and
  to receive a handover acknowledgment signal from the second central unit node indicating that the first central unit node is to transmit to the command signal to the first infrastructure equipment and the first central unit node is to perform the handover procedure.

Paragraph 26. A first central unit node according to Paragraph 25, wherein the handover acknowledgment signal indicates at least one of a new parent node for the first infrastructure equipment and one or more new communications paths for the first infrastructure equipment different to a first communications path currently used by the first infrastructure equipment to communicate with the first central unit node, wherein the new parent node is an infrastructure equipment within the second zone communicatively coupled to the second central unit node.

Paragraph 27. A first central unit node according to Paragraph 26, wherein the command signal comprises an indication that the first infrastructure equipment is to communicate with the core network part via the second central unit node via at least one of the new parent node and one of the new communications paths.

Paragraph 28. A first central unit node according to any of Paragraphs 24 to 27, wherein the first central unit node is configured to communicate with the first infrastructure equipment by transmitting signals to and/or receiving signals from the first infrastructure equipment via one or more of the other infrastructure equipment acting as relay nodes forming a first communications path.

Paragraph 29. A first central unit node according to Paragraph 28, wherein one of the relay nodes is a donor node which allocates radio resources for the first infrastructure equipment to communicate with the relay nodes and with the first central unit node, the donor node comprising a first distributed unit node and the first central unit node.

Paragraph 30. A first central unit node according to Paragraph 29, wherein the handover procedure comprises the first central unit node controlling the first distributed unit node to forward data intended for transmission to the first infrastructure equipment to a second distributed unit node comprised within a second donor node for subsequent transmission of the data to the first infrastructure equipment by the second distributed node, wherein the second donor node further comprises the second central unit node.

Paragraph 31. A first central unit node according to any of Paragraphs 28 to 30, wherein the measurement report indicates that a measured characteristic of a communications link between any two nodes on the first communications path is below a predetermined threshold.

Paragraph 32. A first central unit node according to Paragraph 31, wherein the measured characteristic is at least one of a relative quality of signals received and/or transmitted over the communications link, a power with which signals are received and/or transmitted over the communications link, and an error rate of signals received and/or transmitted over the communications link.

Paragraph 33. A first central unit node according to any of Paragraphs 28 to 32, wherein the measurement report indicates that the first communications device is to switch from communicating with the first central unit node via the first communications path to communicating with the second central unit node via a second communications path formed by a different one or more of the plurality of other infrastructure equipment acting as relay nodes than the first communications path.

Paragraph 34. A first central unit node according to any of Paragraphs 24 to 33, wherein the first central unit node and a first distributed unit node are each comprised within a donor node of the wireless communications network which allocates radio resources for the first infrastructure equipment to communicate with the one or more of the other infrastructure equipment and with the first central unit node.

Paragraph 35. A first central unit node according to Paragraph 34, wherein the handover procedure comprises the first central unit node controlling the first distributed unit node to forward data intended for transmission to the first infrastructure equipment to a second distributed unit node comprised within a second donor node for subsequent transmission of the data to the first infrastructure equipment by the second distributed node, wherein the second donor node further comprises the second central unit node.

Paragraph 36. A first central unit node according to any of Paragraphs 24 to 35, wherein the measurement report indicates that the first infrastructure equipment is moving outside of the first zone and moving inside of the second zone.

Paragraph 37. A first central unit node according to any of Paragraphs 24 to 36, wherein the measurement report indicates that a measured characteristic of a communications link between the first infrastructure equipment and the first central unit node is below a predetermined threshold.

Paragraph 38. A first central unit node according to Paragraph 37, wherein the measured characteristic is at least one of a relative quality of signals received and/or transmitted over the communications link, a power with which signals are received and/or transmitted over the communications link, and an error rate of signals received and/or transmitted over the communications link.

Paragraph 39. A first central unit node according to any of Paragraphs 24 to 38, wherein the measurement report comprises information associated with group mobility of one or more communications devices associated with the first infrastructure equipment, wherein the first infrastructure equipment communicates with the one or more communications devices via an access link.

Paragraph 40. A first central unit node according to any of Paragraphs 24 to 39, wherein signals are transmitted and received by infrastructure equipment within the first zone using a same set of frequencies as signals transmitted and received by infrastructure equipment within the second zone, and wherein the handover procedure is performed between the first central unit node and the second central unit node using physical layer signaling.

Paragraph 41. A method of operating a first central unit node forming part of a wireless communications network comprising a plurality of infrastructure equipment, the first central unit node being communicatively coupled to the core network part, wherein the first central unit node controls a first zone of the wireless communications network, wherein the method comprises receiving, from a first of the plurality of infrastructure equipment, a measurement report comprising an indication of the measurements performed on signals received by the first infrastructure equipment from one or more of the first central unit node and one or more others of the plurality infrastructure equipment, determining, based on the measurement report, that the first infrastructure equipment should communicate with the core network part via a second central unit node communicatively coupled to the core network part instead of the first central unit node, wherein the second central unit node controls a second zone of the wireless communications network, transmitting, to the first infrastructure equipment, a command signal comprising an indication that the first infrastructure equipment should communicate with the core network part via the second central unit node instead of the first central unit node, and performing a handover procedure, indicated by the command signal, with the second central unit node, the handover procedure comprising transmitting configuration information of the first infrastructure equipment to the second central unit node.

Paragraph 42. Circuitry for a first central unit node forming part of a wireless communications network comprising a plurality of infrastructure equipment, the circuitry being communicatively coupled to the core network part, wherein the circuitry controls a first zone of the wireless communications network, wherein the circuitry comprises transceiver circuitry and controller circuitry which are configured in combination to receive, from a first of the plurality of infrastructure equipment, a measurement report comprising an indication of the measurements performed on signals received by the first infrastructure equipment from one or more of the first central unit node and one or more others of the plurality infrastructure equipment, to determine, based on the measurement report, that the first infrastructure equipment should communicate with the core network part via a second central unit node communicatively coupled to the core network part instead of the first central unit node, wherein the second central unit node controls a second zone of the wireless communications network, to transmit, to the first infrastructure equipment, a command signal comprising an indication that the first infrastructure equipment should communicate with the core network part via the second central unit node instead of the first central unit node, and to perform a handover procedure, indicated by the command signal, with the second central unit node, the handover procedure comprising transmitting configuration information of the first infrastructure equipment to the second central unit node.

Paragraph 43. A second central unit node forming part of a wireless communications network comprising a plurality of infrastructure equipment, the second central unit node being communicatively coupled to the core network part, wherein the second central unit node controls a second zone of the wireless communications network, wherein the second central unit node comprises transceiver circuitry and controller circuitry which are configured in combination to receive, from a first central unit node that controls a first zone of the wireless communications network, a handover request signal indicating that the first central unit node is to perform a handover procedure with the second central unit node, the handover procedure comprising the second central unit node receiving configuration information of a first of the infrastructure equipment, communicatively coupled to the first central unit node, from the first central unit node, to determine that the second central unit node is able to communicate with the first infrastructure equipment, and to transmit a handover acknowledgment signal to the first central unit node indicating that the first central unit node is to transmit to a command signal to the first infrastructure equipment and that the first central unit node is to perform the handover procedure, wherein the command signal comprises an indication that the first infrastructure equipment should communicate with the core network part via the second central unit node instead of the first central unit node.

Paragraph 44. A second central unit node according to Paragraph 43, wherein the handover acknowledgment signal indicates at least one of a new parent node for the first infrastructure equipment and one or more new communications paths for the first infrastructure equipment different to a first communications path currently used by the first infrastructure equipment to communicate with the first central unit node, wherein the new parent node is an infrastructure equipment within the second zone communicatively coupled to the second central unit node.

Paragraph 45. A second central unit node according to Paragraph 44, wherein the command signal comprises an indication that the first infrastructure equipment is to communicate with the core network part via the second central unit node via at least one of the new parent node and one of the new communications paths.

Paragraph 46. A second central unit node according to Paragraph 44 or Paragraph 45, wherein the handover request signal comprises an indication of a measurement report transmitted to the first central unit node by the first infrastructure equipment, the measurement report comprising an indication of measurements performed by the first infrastructure equipment on signals received from one or more of the first central unit node and one or more of the other infrastructure equipment, and wherein the second central unit node is configured to select at least one of the new parent node and one of the new communications paths based on the measurement report.

Paragraph 47. A second central unit node according to Paragraph 46, wherein the measurement report indicates that the first infrastructure equipment is moving outside of the first zone and moving inside of the second zone.

Paragraph 48. A second central unit node according to Paragraph 46 or Paragraph 47, wherein the measurement report indicates that a measured characteristic of a communications link between the first infrastructure equipment and the first central unit node is below a predetermined threshold.

Paragraph 49. A second central unit node according to Paragraph 48, wherein the measured characteristic is at least one of a relative quality of signals received and/or transmitted over the communications link, a power with which signals are received and/or transmitted over the communications link, and an error rate of signals received and/or transmitted over the communications link.

Paragraph 50. A second central unit node according to any of Paragraphs 43 to 49, wherein the second central unit node is configured to communicate with the first infrastructure equipment by transmitting signals to and/or receiving signals from the first infrastructure equipment via one or more of the other infrastructure equipment acting as relay nodes forming a second communications path.

Paragraph 51. A second central unit node according to Paragraph 50, wherein one of the relay nodes is a donor node which allocates radio resources for the first infrastructure equipment to communicate with the relay nodes and with the second central unit node, the donor node comprising a second distributed unit node and the second central unit node.

Paragraph 52. A second central unit node according to Paragraph 51, wherein the handover procedure comprises the second central unit node controlling the second distributed unit node to receive data intended for transmission to the first infrastructure equipment from a first distributed unit node comprised within a second donor node for subsequent transmission of the data to the first infrastructure equipment by the second distributed node, wherein the second donor node further comprises the first central unit node.

Paragraph 53. A second central unit node according to any of Paragraphs 50 to 52, wherein the handover request signal comprises an indication of a measurement report transmitted to the first central unit node by the first infrastructure equipment, the measurement report comprising an indication of measurements performed by the first infrastructure equipment on signals received from one or more of the first central unit node and one or more of the other infrastructure equipment.

Paragraph 54. A second central unit node according to Paragraph 53, wherein the measurement report indicates that a measured characteristic of a communications link between any two nodes on a first communications path between the first infrastructure equipment and the first central unit node is below a predetermined threshold, the first communications path being formed by a different one or more of the plurality of other infrastructure equipment acting as relay nodes than the second communications path.

Paragraph 55. A second central unit node according to Paragraph 54, wherein the measured characteristic is at least one of a relative quality of signals received and/or transmitted over the communications link, a power with which signals are received and/or transmitted over the communications link, and an error rate of signals received and/or transmitted over the communications link.

Paragraph 56. A second central unit node according to any of Paragraphs 53 to 55, wherein the measurement report indicates that the first communications device is to switch from communicating with the first central unit node via a first communications path to communicating with the second central unit node via the second communications path, the first communications path being formed by a different one or more of the plurality of other infrastructure equipment acting as relay nodes than the second communications path.

Paragraph 57. A second central unit node according to any of Paragraphs 43 to 56, wherein the second central unit node and a second distributed unit node are each comprised within a donor node of the wireless communications network which allocates radio resources for the first infrastructure equipment to communicate with the one or more of the other infrastructure equipment and with the second central unit node.

Paragraph 58. A second central unit node according to Paragraph 57, wherein the handover procedure comprises the second central unit node controlling the second distributed unit node to receive data intended for transmission to the first infrastructure equipment from a first distributed unit node comprised within a second donor node for subsequent transmission of the data to the first infrastructure equipment by the second distributed node, wherein the second donor node further comprises the first central unit node.

Paragraph 59. A second central unit node according to any of Paragraphs 43 to 58, wherein the measurement report comprises information associated with group mobility of one or more communications devices associated with the first infrastructure equipment, wherein the first infrastructure equipment communicates with the one or more communications devices via an access link.

Paragraph 60. A second central unit node according to any of Paragraphs 43 to 59, wherein signals are transmitted and received by infrastructure equipment within the first zone using a same set of frequencies as signals transmitted and received by infrastructure equipment within the second zone, and wherein the handover procedure is performed between the second central unit node and the first central unit node using physical layer signaling.

Paragraph 61. A method of operating a second central unit node forming part of a wireless communications network comprising a plurality of infrastructure equipment, the second central unit node being communicatively coupled to the core network part, wherein the second central unit node controls a second zone of the wireless communications network, wherein the method comprises receiving, from a first central unit node that controls a first zone of the wireless communications network, a handover request signal indicating that the first central unit node is to perform a handover procedure with the second central unit node, the handover procedure comprising the second central unit node receiving configuration information of a first of the infrastructure equipment, communicatively coupled to the first central unit node, from the first central unit node, determining that the second central unit node is able to communicate with the first infrastructure equipment, and transmitting a handover acknowledgment signal to the first central unit node indicating that the first central unit node is to transmit to a command signal to the first infrastructure equipment and that the first central unit node is to perform the handover procedure, wherein the command signal comprises an indication that the first infrastructure equipment should communicate with the core network part via the second central unit node instead of the first central unit node.

Paragraph 62. Circuitry for a second central unit node forming part of a wireless communications network comprising a plurality of infrastructure equipment, the circuitry being communicatively coupled to the core network part, wherein the circuitry controls a second zone of the wireless communications network, wherein the circuitry comprises transceiver circuitry and controller circuitry which are configured in combination to receive, from a first central unit node that controls a first zone of the wireless communications network, a handover request signal indicating that the first central unit node is to perform a handover procedure with the second central unit node, the handover procedure comprising the second central unit node receiving configuration information of a first of the infrastructure equipment, communicatively coupled to the first central unit node, from the first central unit node, to determine that the second central unit node is able to communicate with the first infrastructure equipment, and to transmit a handover acknowledgment signal to the first central unit node indicating that the first central unit node is to transmit to a command signal to the first infrastructure equipment and that the first central unit node is to perform the handover procedure, wherein the command signal comprises an indication that the first infrastructure equipment should communicate with the core network part via the second central unit node instead of the first central unit node.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.

[2] RP-161901, "Revised work item proposal: Enhancements of NB-IoT", Huawei, HiSilicon, 3GPP TSG RAN Meeting #73, New Orleans, USA, Sep. 19-22, 2016.

[3] RP-170831, "New SID Proposal: Study on Integrated Access and Backhaul for NR", AT&T, 3GPP RAN Meeting #75, Dubrovnik, Croatia, March 2017.

[4] 3GPP TTR 38.874 "$3^{rd}$ Generation Partnership Project; Technical Specification Group Radio Access Network; Study on Integrated Access and Backhaul; (Release 15)", $3^{rd}$ Generation Partnership Project, February 2018.

[5] R2-1801606, "Proposals on IAB Architecture", Qualcomm et al, 3GPP TSG-RAN WG2 NR Ad hoc 1801, Vancouver, Canada, Jan. 22-26, 2018.

[6] R3-181502, "Way Forward—IAB Architecture for L2/3 relaying", Qualcomm et al, 3GPP TSG-RAN WG3 Meeting #99, Athens, Greece, Feb. 26-Mar. 2, 2018.

What is claimed is:

1. A first infrastructure equipment forming part of a wireless communications network comprising a plurality of other infrastructure equipment, the first infrastructure equipment being configured to communicate with one or more of the plurality of other infrastructure equipment and the first infrastructure equipment being configured to communicate with a core network part of the wireless communications network via a first central unit node communicatively coupled to the core network part, wherein the first central unit node controls a first zone of the wireless communications network, wherein the first infrastructure equipment comprises transceiver circuitry and controller circuitry which are configured in combination to perform measurements on signals received from one or more of the first central unit node and the one or more of the plurality of other infrastructure equipment, to transmit, to the first central unit node, a measurement report comprising an indication of the measurements performed on the received signals, to receive, from the first central unit node, a command signal comprising an indication that the first infrastructure equipment should communicate with the core network part via a second central unit node communicatively coupled to the core network part instead of the first central unit node, wherein the second central unit node controls a second zone of the wireless communications network, wherein the command signal indicates that the first central unit node is to perform a handover procedure with the second central unit node, the handover procedure comprising the first central unit node transmitting configuration information of the first infrastructure equipment to the second central unit node, and to communicate with the core network part via the second central unit node.

2. A first infrastructure equipment according to claim 1, wherein the first infrastructure equipment is configured to communicate with the one or more of the plurality of other infrastructure equipment via a backhaul communications link by periodically transmitting a plurality of beams of radio signals in at least one of different spatial directions and at different times.

3. A first infrastructure equipment according to claim 2, wherein the first infrastructure equipment is configured to communicate with one or more communications devices via an access link.

4. A first infrastructure equipment according to claim 1, wherein the first infrastructure equipment is configured to communicate with the core network part by transmitting signals to and/or receiving signals from the first central unit node or the second central unit node via one or more of the plurality of other infrastructure equipment acting as relay nodes forming a communications path.

5. A first infrastructure equipment according to claim 4, wherein one of the relay nodes is a donor node, the donor node either comprising a first distributed unit node and the first central unit node or comprising a second distributed unit node and the second central unit node, the first infrastructure equipment configured to receive, from the donor node, allocations of radio resources for communicating with the relay nodes and with the first central unit node or the second central unit node.

6. A first infrastructure equipment according to claim 5, wherein the handover procedure comprises the first central unit node controlling the first distributed unit node to forward data intended for transmission to the first infrastructure equipment to the second distributed unit node for subsequent transmission of the data to the first infrastructure equipment by the second distributed node.

7. A first infrastructure equipment according to claim 4, wherein one of the relay nodes is a parent node communicatively coupled to the first infrastructure equipment via a backhaul communications link and configured to allocate radio resources to the first infrastructure equipment, the radio resources forming part of a set of radio resources allocated to the parent node by a donor node of the wireless communications network.

8. A first infrastructure equipment according to claim 7, wherein the first infrastructure equipment is configured
- to identify, from the command signal, at least one of a new parent node and one or more new communications paths different to a first communications path currently used by the first infrastructure equipment to communicate with the first central unit node, wherein the new parent node is an infrastructure equipment within the second zone communicatively coupled to the second central unit node, and
- to communicate with the core network part via the second central unit node via at least one of the new parent node and one of the new communications paths.

9. A first infrastructure equipment according to claim 8, wherein the first infrastructure equipment is configured, before communicating with the core network part via the second central unit node via at least one of the new parent node and one of the new communications paths,
- to perform a random access procedure with the new parent node.

10. A first infrastructure equipment according to claim 8, wherein the first infrastructure equipment is configured, before communicating with the core network part via the second central unit node via at least one of the new parent node and one of the new communications paths,
- to determine that a timing advance for the second central unit node is approximately equal to zero, and
- to communicate, without first performing a random access procedure, with the core network part via the second central unit node via at least one of the new parent node and one of the new communications paths.

11. A first infrastructure equipment according to claim 4, wherein the measurement report indicates that a measured characteristic of a communications link between any two nodes on a first communications path between the first infrastructure equipment and the first central unit node is below a predetermined threshold.

12. A first infrastructure equipment according to claim 11, wherein the measured characteristic is at least one of a relative quality of signals received and/or transmitted over the communications link, a power with which signals are received and/or transmitted over the communications link, and an error rate of signals received and/or transmitted over the communications link.

13. A first infrastructure equipment according to claim 4, wherein the measurement report indicates that the first communications device is to switch from communicating with the first central unit node via a first communications path to communicating with the second central unit node via a second communications path formed by a different one or more of the plurality of other infrastructure equipment acting as relay nodes than the first communications path.

14. A first infrastructure equipment according to claim 1, wherein the first central unit node and a first distributed unit node are each comprised within a first of a plurality of donor nodes of the wireless communications network, and the second central unit node and a second distributed unit node are each comprised within a second of the plurality of donor nodes, the first infrastructure equipment configured to receive, from the first donor node or the second donor node, allocations of radio resources for communicating with the one or more of the plurality of other infrastructure equipment and with the first central unit node or the second central unit node.

15. A first infrastructure equipment according to claim 14, wherein the handover procedure comprises the first central unit node controlling the first distributed unit node to forward data intended for transmission to the first infrastructure equipment to the second distributed unit node for subsequent transmission of the data to the first infrastructure equipment by the second distributed node.

16. A first infrastructure equipment according to claim 1, wherein the measurement report indicates that the first infrastructure equipment is moving outside of the first zone and moving inside of the second zone.

17. A first infrastructure equipment according to claim 1, wherein the measurement report indicates that a measured characteristic of a communications link between the first infrastructure equipment and the first central unit node is below a predetermined threshold.

18. A first infrastructure equipment according to claim 17, wherein the measured characteristic is at least one of a relative quality of signals received and/or transmitted over the communications link, a power with which signals are received and/or transmitted over the communications link, and an error rate of signals received and/or transmitted over the communications link.

19. A method of operating a first infrastructure equipment forming part of a wireless communications network comprising a plurality of other infrastructure equipment, the first infrastructure equipment being configured to communicate with one or more of the plurality of other infrastructure equipment and the first infrastructure equipment being configured to communicate with a core network part of the wireless communications network via a first central unit node communicatively coupled to the core network part, wherein the first central unit node controls a first zone of the wireless communications network, wherein the method comprises
- performing measurements on signals received from one or more of the first central unit node and the one or more of the plurality of other infrastructure equipment,
- transmitting, to the first central unit node, a measurement report comprising an indication of the measurements performed on the received signals,
- receiving, from the first central unit node, a command signal comprising an indication that the first infrastructure equipment should communicate with the core network part via a second central unit node communicatively coupled to the core network part instead of the first central unit node, wherein the second central unit node controls a second zone of the wireless communications network, wherein the command signal indicates that the first central unit node is to perform a handover procedure with the second central unit node, the handover procedure comprising the first central unit node transmitting configuration information of the first infrastructure equipment to the second central unit node, and communicating with the core network part via the second central unit node.

20. A method of operating a first central unit node forming part of a wireless communications network comprising a plurality of infrastructure equipment, the first central unit node being communicatively coupled to the core network part, wherein the first central unit node controls a first zone of the wireless communications network, wherein the method comprises receiving, from a first of the plurality of infrastructure equipment, a measurement report comprising an indication of the measurements performed on signals received by the first infrastructure equipment from one or more of the first central unit node and one or more others of the plurality infrastructure equipment, determining, based on the measurement report, that the first infrastructure equipment should communicate with the core network part via a second central unit node communicatively coupled to the core network part instead of the first central unit node, wherein the second central unit node controls a second zone of the wireless communications network, transmitting, to the first infrastructure equipment, a command signal comprising an indication that the first infrastructure equipment should communicate with the core network part via the second central unit node instead of the first central unit node, and performing a handover procedure, indicated by the command signal, with the second central unit node, the handover procedure comprising transmitting configuration information of the first infrastructure equipment to the second central unit node.

* * * * *